(12) United States Patent
Moon et al.

(10) Patent No.: US 10,992,028 B2
(45) Date of Patent: Apr. 27, 2021

(54) ELECTRONIC DEVICE SUPPORTING SIGNAL RADIATION OF ANTENNA STRUCTURE

(71) Applicant: Samsung Electronics Co., Ltd., Gyeonggi-do (KR)

(72) Inventors: Heecheul Moon, Gyeonggi-do (KR); Kwonho Son, Gyeonggi-do (KR); Chongo Yoon, Gyeonggi-do (KR); Mincheol Seo, Gyeonggi-do (KR); Minwoo Yoo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/789,729

(22) Filed: Feb. 13, 2020

(65) Prior Publication Data
US 2020/0266522 A1    Aug. 20, 2020

(30) Foreign Application Priority Data
Feb. 19, 2019 (KR) .......................... 10-2019-0019468

(51) Int. Cl.
*H01Q 1/24* (2006.01)
(52) U.S. Cl.
CPC .................................. *H01Q 1/243* (2013.01)
(58) Field of Classification Search
CPC .......... H01Q 1/24; H01Q 1/241; H01Q 1/243; H01Q 1/38; H01Q 21/28; H01Q 9/04; H01Q 9/0414; H01Q 9/42
See application file for complete search history.

(56) References Cited

U.S. PATENT DOCUMENTS

| | | |
|---|---|---|
| 8,712,233 B2 | 4/2014 | Gibbs et al. |
| 9,137,891 B2 | 9/2015 | Gibbs et al. |
| 9,666,934 B2 | 5/2017 | Lombardi et al. |

(Continued)

FOREIGN PATENT DOCUMENTS

| | | |
|---|---|---|
| EP | 2 456 006 A1 | 5/2012 |
| KR | 10-2012-0119834 A | 10/2012 |

(Continued)

OTHER PUBLICATIONS

International Search Report dated Jun. 9, 2020.
European Search Report dated Jun. 9, 2020.

*Primary Examiner* — Thai Pham
(74) *Attorney, Agent, or Firm* — Cha & Reiter, LLC.

(57) ABSTRACT

An electronic device includes a housing including a first plate facing in a first direction, a second plate facing in a second direction, and a side member surrounding a space between the first plate and the second plate, a support member interposed between the first plate and the second plate and including a metallic structure, an antenna structure mounted on the support member and including a first surface facing in a third direction toward the side member, and a polymer structure disposed in a space surrounded by the first plate, the support member, the side member, and the first surface of the antenna structure, and coupled to the metallic structure. The coupled metallic structure and polymer structure includes a groove bounded by the first surface, a second surface on the polymer structure forming an acute angle with the first surface, and a third surface substantially perpendicular to the second surface.

20 Claims, 24 Drawing Sheets

(56) References Cited

U.S. PATENT DOCUMENTS

| | | |
|---|---|---|
| 9,788,211 B2 | 10/2017 | Zhang |
| 10,103,424 B2 | 10/2018 | Noori et al. |
| 10,516,204 B2 | 12/2019 | Cho et al. |
| 2012/0119958 A1 | 5/2012 | Uejima et al. |
| 2013/0223836 A1 | 8/2013 | Gibbs et al. |
| 2013/0257712 A1 | 10/2013 | Imamura |
| 2014/0226291 A1 | 8/2014 | Gibbs et al. |
| 2015/0256211 A1* | 9/2015 | Miyazaki ............... G06F 1/1698 455/575.8 |
| 2015/0257012 A1 | 9/2015 | Zhang |
| 2016/0234362 A1* | 8/2016 | Moon ................... H04M 1/185 |
| 2016/0301139 A1 | 10/2016 | Lombardi et al. |
| 2017/0025739 A1 | 1/2017 | Caratelli et al. |
| 2017/0309991 A1 | 10/2017 | Noori et al. |
| 2018/0014204 A1 | 1/2018 | Zhang |
| 2018/0241115 A1* | 8/2018 | Cho ................... H04M 1/0266 |
| 2018/0309199 A1 | 10/2018 | Yu et al. |
| 2018/0331418 A1* | 11/2018 | Kim ....................... H01Q 21/28 |
| 2020/0153115 A1 | 5/2020 | Yun et al. |
| 2020/0365973 A1* | 11/2020 | Jeon ..................... H01Q 9/0407 |

FOREIGN PATENT DOCUMENTS

| | | |
|---|---|---|
| KR | 10-2016-0126851 A | 11/2016 |
| KR | 10-2017-0083300 A | 7/2017 |
| WO | 2020/096361 A1 | 5/2020 |

* cited by examiner

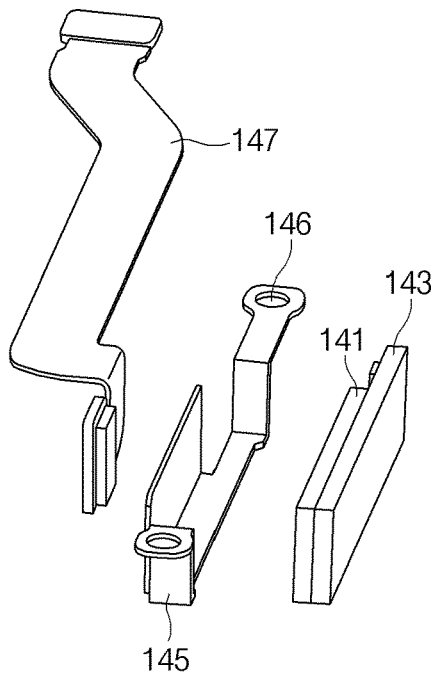

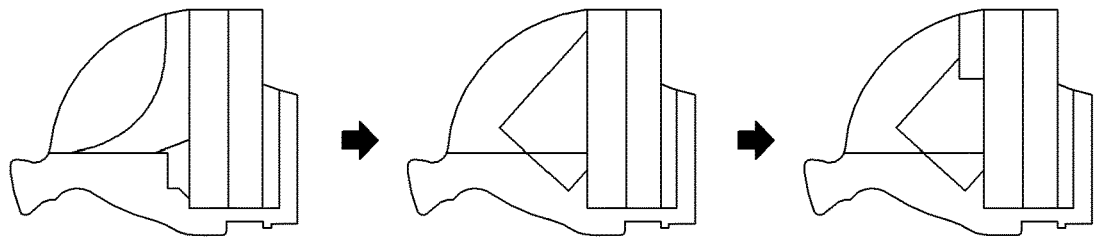

| RIGHT | | S33 (WORST BAND) | V-Pol | | | S44 (WORST BAND) | H-Pol | | |
|---|---|---|---|---|---|---|---|---|---|
| | | | (FRONT SURFACE) -60° | -90° | (REAR SURFACE) -120° | | -60° | -90° | -120° |
| 28 GHz | MAXIMUM PERFORMANCE ADVANCED STRUCTURE | -7.3 dB | 6.6 dBi | 9.3 dBi | 8.8 dBi | -5.3 dB | 3.0 dBi | 7.5 dBi | 9.4 dBi |
| | PRIMARY MOUNTING REVIEW | -6.8 dB | 4.6 dBi | 7.5 dBi | 6.9 dBi | -6.3 dB | 3.5 dBi | 7.9 dBi | 9.1 dBi |
| | SECONDARY MOUNTING REVIEW | -12.6 dB | 5.9 dBi | 8.7 dBi | 8.0 dBi | -8.4 dB | 2.8 dBi | 7.3 dBi | 8.6 dBi |
| 39 GHz | MAXIMUM PERFORMANCE ADVANCED STRUCTURE | -13.0 dB | 9.6 dBi | 11.5 dBi | 7.9 dBi | -13.5 dB | 3.9 dBi | 9.2 dBi | 11.1 dBi |
| | PRIMARY MOUNTING REVIEW | -12.5 dB | 9.5 dBi | 10.8 dBi | 4.5 dBi | -21.6 dB | 1.4 dBi (NULL GENERATED) | 5.8 dBi | 7.2 dBi |
| | SECONDARY MOUNTING REVIEW | -12.2 dB | 9.7 dBi | 11.2 dBi | 4.5 dBi | -8.4 dB | 2.6 dBi | 7.6 dBi | 9.2 dBi |

FIG.9

ELECTRONIC DEVICE SUPPORTING SIGNAL RADIATION OF ANTENNA STRUCTURE

CROSS-REFERENCE TO RELATED APPLICATION(S)

This application is based on and claims priority under 35 U.S.C. § 119 to Korean Patent Application No. 10-2019-0019468, filed on Feb. 19, 2019, in the Korean Intellectual Property Office, the disclosure of which is incorporated by reference herein its entirety.

BACKGROUND

1. Field

One or more embodiments of the instant disclosure generally relate to an electronic device including an antenna structure.

2. Description of Related Art

Advancements in wireless protocols have been made to more efficiently transceive information associated with functions or services of electronic devices. For example, recently, implementation of the next generation mobile communication technology using signals in ultrahigh frequency bands called fifth generation (5G) has begun. Under the 5G protocol, high-speed and large capacity data transmission is possible due to the use of millimeter wave (mmWave) bands. The 5G protocol is promulgated by the 3rd Generation Partnership Project (3GPP).

Electronic devices supporting 5G may include an antenna structure disposed within that supports 5G. For example, the antenna structure may employ metallic structure (or coupled to at least a portion of the housing) corresponding to at least a portion of a housing as a radiator, and may be disposed in an area adjacent to the housing so as to ensure signal transmission/reception efficiency in accordance with signal characteristics (e.g., directionality) of the mmWave band.

The above information is presented as background information only to assist with an understanding of the disclosure. No determination has been made, and no assertion is made, as to whether any of the above might be applicable as prior art with regard to the disclosure.

SUMMARY

In arranging the structure of the antenna structure, a non-conductive structure may be disposed between the antenna structure and the housing to physically support the housing and/or to prevent moisture from being introduced onto the antenna structure. The non-conductive structure may be designed to have the shape corresponding to the shape of the housing at one area thereof (e.g., the area facing the housing) and a shape for avoiding the antenna structure at another area thereof (e.g., the area opposite to the housing). Due to its potentially irregular shape, the dielectric characteristic of the non-conductive structure may not be constant. Therefore, when signals radiated from the antenna structure are applied to the non-conductive structure, the radiated signals are affected by the variable dielectric characteristic of the non-conductive structure, and thus signal performance may be degraded.

Aspects of the disclosure are to address at least the above-mentioned problems and/or disadvantages and to provide at least the advantages described below.

In accordance with an aspect of the disclosure, an electronic device may include a housing including a first plate having an external surface facing in a first direction, a second plate having an external surface facing in a second direction opposite to the first direction, and a side member surrounding a first space between the first plate and the second plate and coupled to the second plate or integrated with the second plate, a support member coupled to the side member or integrated with the side member, interposed between the first plate and the second plate, and including a metallic structure, an antenna structure interposed between the first plate and the support member, mounted on the support member, including a first surface facing in a third direction toward the side member, and including at least one antenna pattern configured to output a directional beam facing in the third direction, a polymer structure disposed in a second space surrounded by the first plate, the support member, the side member, and the first surface of the antenna structure, and coupled to the metallic structure, and a wireless communication circuitry electrically connected with the antenna pattern to transmit and/or receive a signal having a frequency between 3 GHz and 100 GHz.

In accordance with another aspect of the disclosure, the coupled metallic structure and polymer structure may include at least one groove bounded by the first surface, a second surface on the polymer structure forming an acute angle with the first surface, and a third surface substantially perpendicular to the second surface.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a view illustrating an antenna structure, according to an embodiment;

Regarding the description of drawings, the same reference numerals will be assigned to the same components or corresponding components.

DETAILED DESCRIPTION

Accordingly, an aspect of the disclosure is to provide an electronic device where influence exerted on signals radiated from an antenna structure is minimized. This may be done by modifying an electronic device structure adjacent to the antenna structure.

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
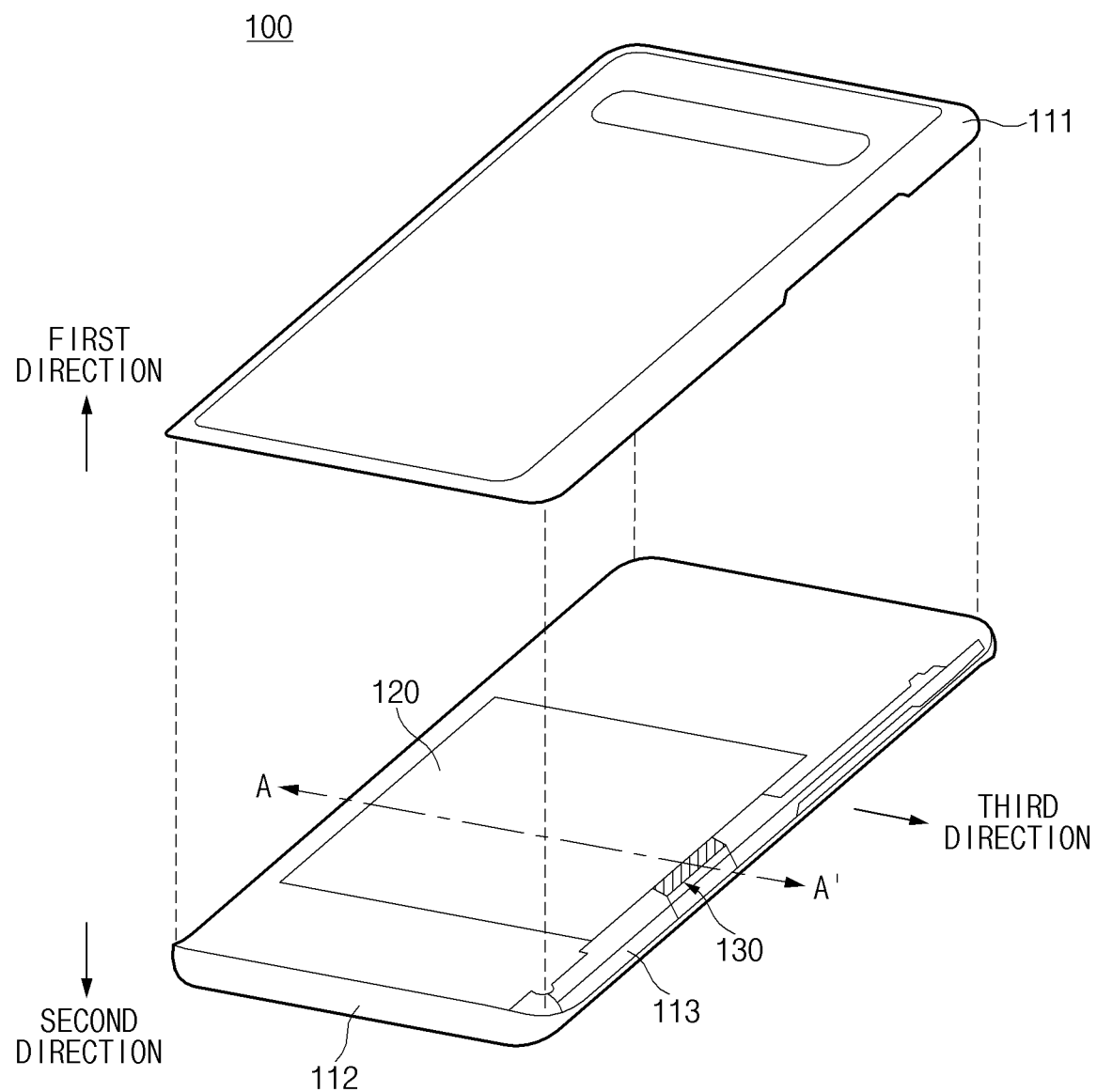
FIG. 1 is a view illustrating a rear surface of an electronic device according to an embodiment.

FIG. 1 is a view illustrating a rear surface of an electronic device according to an embodiment.

Referring to FIG. 1, an electronic device 100 may include a housing that defines the body of the electronic device 100 or at least a portion of the outer appearance of the electronic device 100. According to an embodiment, the housing may include a first plate 111 (or rear plate) facing in a first direction, a second plate 112 (or front plate or cover glass) facing in a second direction opposite to the first direction, and a side member 113 disposed in at least a portion between edges of the first plate 111 and the second plate 112 to surround the space between the first plate 111 and the second plate 112. The first plate 111, the second plate 112, and the side member 113 are coupled to each other in at least one area thereof to form the housing. An inner space of the electronic device 100 is encapsulated by the first plate 111, the second plate 112, and the side member 113. In this regard, one area of the edge of the first plate 111 is curved with a specific curvature to extend in the second direction. In correspondence to the first plate 111, one area of the edge of the second plate 112 is curved with a curvature identical to or similar to the specific curvature of the first plate 111 to extend in the first direction. In an embodiment, the side member 113 may be integrated with the second plate 112 and included as a portion of the second plate 112. In this case, the housing of the electronic device 100 may be formed by coupling of the first plate 111 and the second plate 112.

In an embodiment, at least one component of the electronic device 100 may be disposed in the inner space of the housing of the electronic device 100. For example, a battery 120 that supplies power to various components of the electronic device 100 may be mounted in the inner space of the housing. In addition, an antenna structure supporting 5G mobile communication of the electronic device 100 may be, depending on the structure of the electronic device, mounted in a cavity area 130 formed adjacent to the mounting area of the battery 120. For example, the cavity area 130 may be located at the lower part of the right edge of the electronic device 100 when the electronic device 100 is viewed in the second direction with the first plate 111 removed. According to various other embodiments, the above-described mounting area of the antenna structure is provided according to one embodiment, and the electronic device 100 may further include at least one other antenna structure in various other areas.

According to an embodiment, the structure of the electronic device 100 with the cavity area 130 may be modified to support the operation of the antenna structure mounted in the cavity area 130 (e.g., radiating signals at a specific frequency band). For example, the structure of the electronic device 100 facing at least a portion of the antenna structure may function as a medium for the signals radiated from the antenna structure. Accordingly, the shape of the structure of the electronic device 100 may be modified to have a relatively constant dielectric characteristic in order to minimize the influence exerted on the radiated signals. Hereinafter, the structure of the electronic device 100 for supporting signal radiation of the antenna structure will be described with reference to accompanying drawings.

Figure 2A:
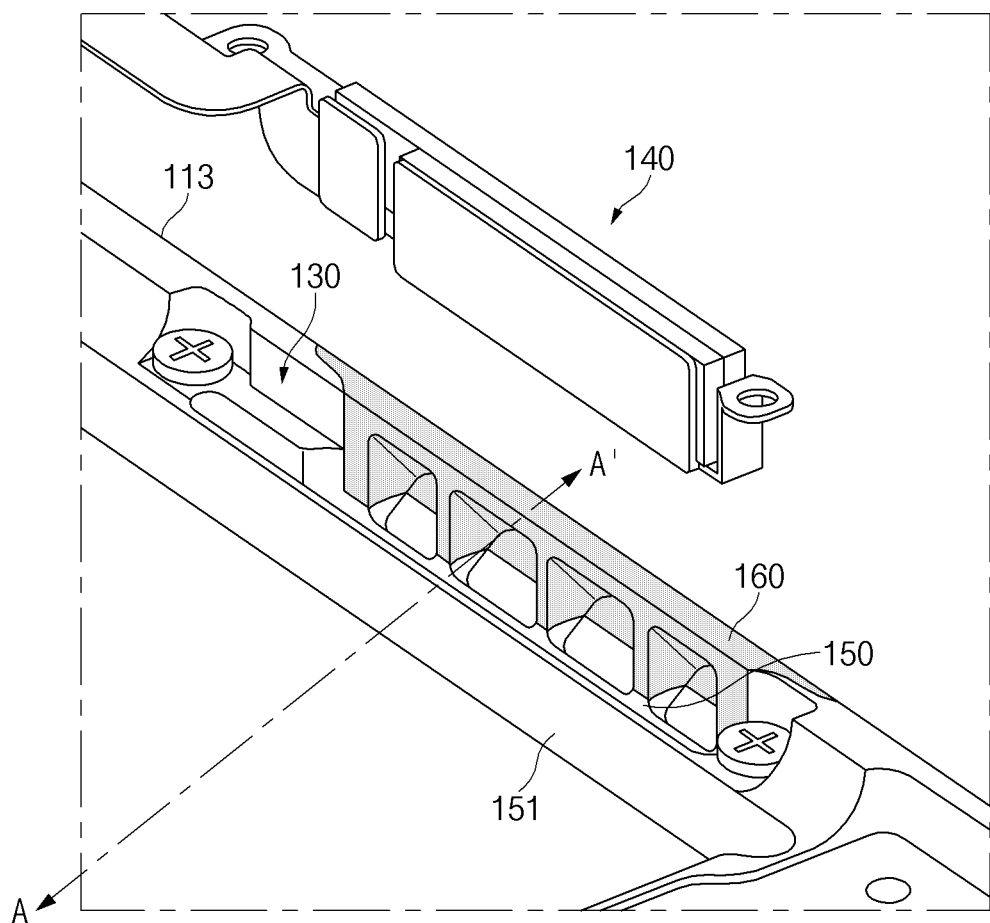
FIG. 2A is a perspective view illustrating the arrangement space of an antenna structure of an electronic device, according to a first embodiment.
Figure 2B:
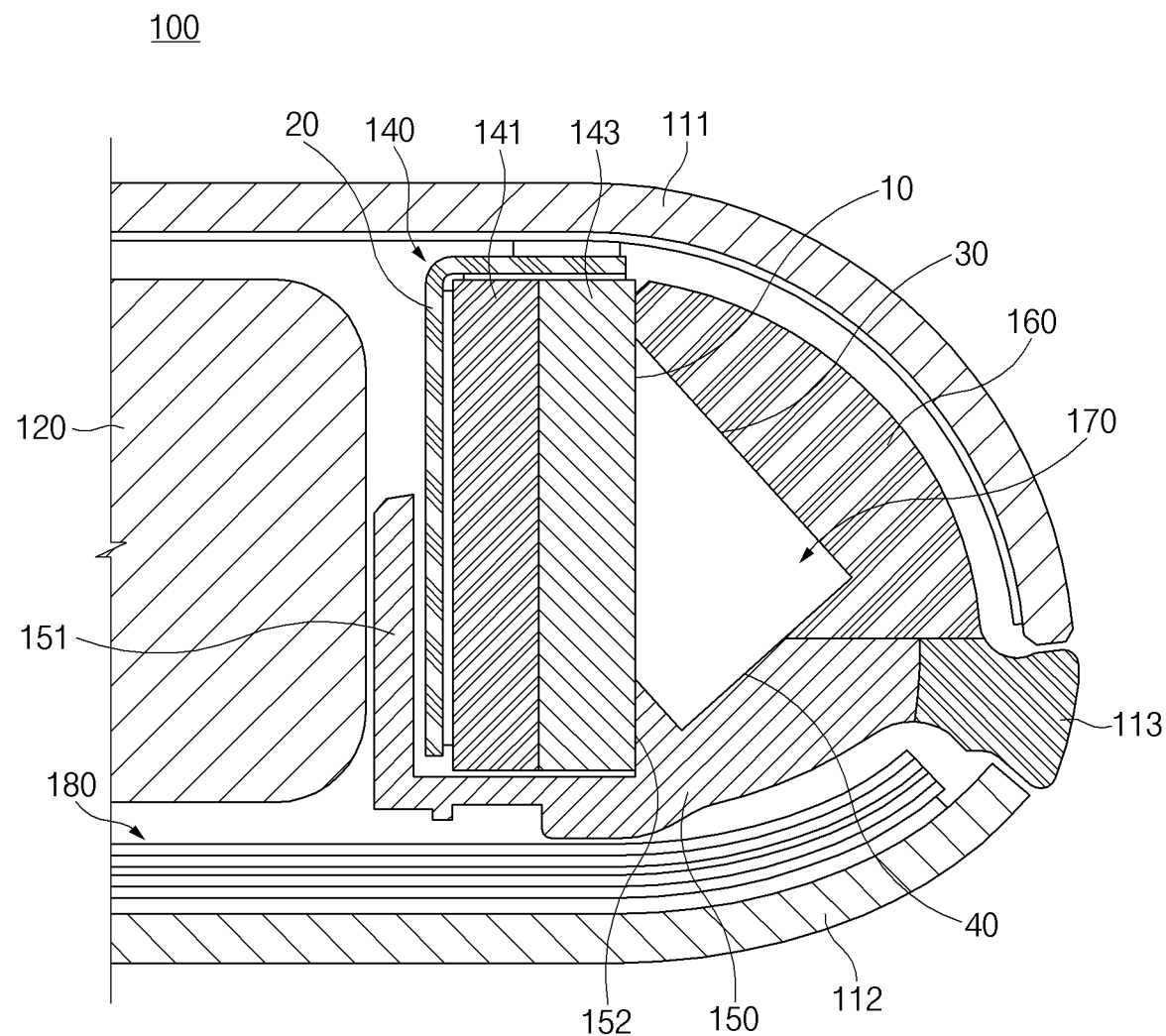
FIG. 2B is a sectional view of the electronic device taken along line A-A' in FIG. 2A according to the first embodiment.

FIG. 2A is a perspective view illustrating the arrangement space of an antenna structure of an electronic device according to a first embodiment, and FIG. 2B is a sectional view of the electronic device taken along A-A' according to the first embodiment. In FIG. 2A, for illustration purposes, the first plate 111 is removed.

Referring to FIGS. 2A and 2B, the cavity area 130 corresponding to the arrangement space of an antenna structure 140 is formed in the inner space of the housing of the electronic device 100. A support member 150 and a polymer structure 160 may be disposed in the inner space of the housing to define at least some surfaces or edges of the cavity area 130. According to an embodiment, the support member 150 and the polymer structure 160 may replace certain portions of the side member 113, or may be coupled to or integrated with the side member 113 to form a portion of the side member 113.

According to different embodiments, the support member 150 may be coupled to one area of the side member 113 or may be formed integrally with the side member 113. The support member 150 may extend inward into the inner space of the housing between, and may have a step 152 formed in one portion of the extended section. In addition, one end of the support member 150 extending from the step 152 may be bent at a specific angle (e.g. at a substantially right angle as shown in FIG. 2B) toward the first plate 111 to form the rib 151. According to various different embodiments, the step 152 and a rib 151 may be formed through various processes. For example, the step 152 and the rib 151 may be coupled onto the support member 150 by welding. In the welding process of the step 152 and the rib 151, the gap between the step 152 and the rib 151 may be determined based on the width or the thickness of the antenna structure 140. According to one embodiment, the rib 151 may define the edge of the space in which the battery 120 is disposed in one direction, and the edge of the cavity area 130 in which the antenna structure 140 is disposed in an opposite direction. In other words, the rib 151 corresponding to one end of the support member 150 may separate the space in which the battery 120 is to be disposed from the space in which the antenna structure 140 is to be disposed.

In one embodiment, the antenna structure 140 may be interposed in the space between the support member 150 and the first plate 111. For example, in the antenna structure 140, at least a portion of a first surface 10 associated with forming a directional beam makes contact with the step 152 while facing the side member 113 (or the third direction of FIG. 1). At the same time, at least a portion of a second surface 20, which is opposite the first surface 10, may be installed (or mounted) on the support member 150 to make contact with the rib 151. Accordingly, a portion of the first surface 10 of the antenna structure 140 is supported or fixed by the step 152 of the support member 150, and at least a portion of the second surface 20 may be supported or fixed to the rib 151 of the support member 150.

In one embodiment, the antenna structure 140 installed (or mounted) on the support member 150 may include at least one antenna element. The at least one antenna element may include, for example, a shielding member 141 (e.g., a shield can) and a printed circuit board 143 having at least one dipole antenna pattern and at least one patch antenna pattern. In one embodiment, a power management integrated circuit (PMIC) and a radio frequency integrated circuit (RFIC) may be disposed inside the shielding member 141. The antenna structure 140 may form a directional beam by performing beamforming in a direction (e.g., the third direction of FIG. 1) corresponding to the side member 113 and/or a direction (e.g., the first direction of FIG. 1) corresponding to the first plate 111 by using the at least one antenna element. In this regard, the support member 150 may include a structure to support beamforming by the antenna structure 140. For example, the support member 150 may include a metallic structure in at least a portion thereof to function as a radiator of the antenna structure 140. In addition, the first plate 111 may include a metallic structure in at least a portion thereof to function as a radiator of the antenna structure 140.

In an embodiment, the polymer structure 160 may be disposed in a space formed by the side member 113, the support member 150, the antenna structure 140, and the first plate 111. For example, on a specific section of the side member 113 corresponding to the cavity area 130, part of the polymer structure 160 is coupled to the side member 113, and another part of the polymer structure 160 may be disposed to be coupled to the support member 150 (or the metallic structure included in the support member 150). According to an embodiment, one area of the polymer structure 160 is implemented in a shape corresponding to the shape of the edge of the first plate 111 curved with a specific curvature to make contact with the edge of the first plate 111. In addition, another area of the polymer structure 160 may make contact with the edge of the first surface 10 of the antenna structure 140 installed (or mounted) on the support member 150. Accordingly, the polymer structure 160 may support at least the first plate 111 and the antenna structure 140. In addition, the polymer structure 160 may block moisture from being introduced onto the antenna structure 140 from outside the device. According to an embodiment, at least one metal pattern may be disposed on a portion of the polymer structure 160, and the antenna structure 140 may use the at least one metal pattern on the polymer structure 160 as a radiator.

According to an embodiment, after the support member 150 and the polymer structure 160 are coupled to each other, parts of the support member 150 and the polymer structure 160 may be removed. This may be done by partly removing (or cutting out) the support member 150 and the polymer structure 160 using a machining tool with a specific inclination. The removal may be done prior to seating the first plate 111, the battery 120, and the antenna structure 140 in the electronic device 100. According to an embodiment, the specific inclination of the machining tool may be designed such that, when portions of the support member 150 and the polymer structure 160 are removed, a third surface 30 formed in the polymer structure 160 forms an acute angle with respect to the first surface 10 of the antenna structure 140. In addition, the machining tool may be, for example, designed to be applied at a specific depth by the head end of the machining tool such that a fourth surface 40 is formed on the support member 150 and the polymer structure 160 when coupled to each other. The proportion of the portions of the fourth surface 40 disposed on the support member 150 and the polymer structure 160 depends on where the fourth surface 40 meets the boundary between the support member 150 and the polymer structure 160.

According to an embodiment, through the process of partly removing the support member 150 and the polymer structure 160 when they are coupled to each other, at least one groove 170 may be formed in the support member 150 and the polymer structure 160. The groove 170 may be defined by at least the third surface 30 and the fourth surface 40 substantially perpendicular to the third surface 30. According to an embodiment, the at least one groove 170 may be referred to as an air gap because it represents a space where nothing is disposed.

In an embodiment, by creating this air gap, the width or thickness of the polymer structure 160 from the third surface 30 to the edge of the polymer structure 160 making contact with the edge of the first plate 111 may be relatively uniform. In this regard, when the width or thickness in this portion of the polymer structure 160 is uniform, the dielectric characteristic of the polymer structure 160 may be relatively constant, which may minimize the influence exerted on signals radiated from the adjacent antenna structure 140. In addition, the air contained in the at least one groove 170 may also minimize the influence exerted on the signals radiated from the adjacent antenna structure 140.

According to an embodiment, a display 180 may be disposed under the battery 120 and the support member 150 in the inner space of the housing of the electronic device 100. According to an embodiment, the display 180 may be at least partly flexible such that its shape corresponds to the curved shape of the second plate 112.

Figure 3:
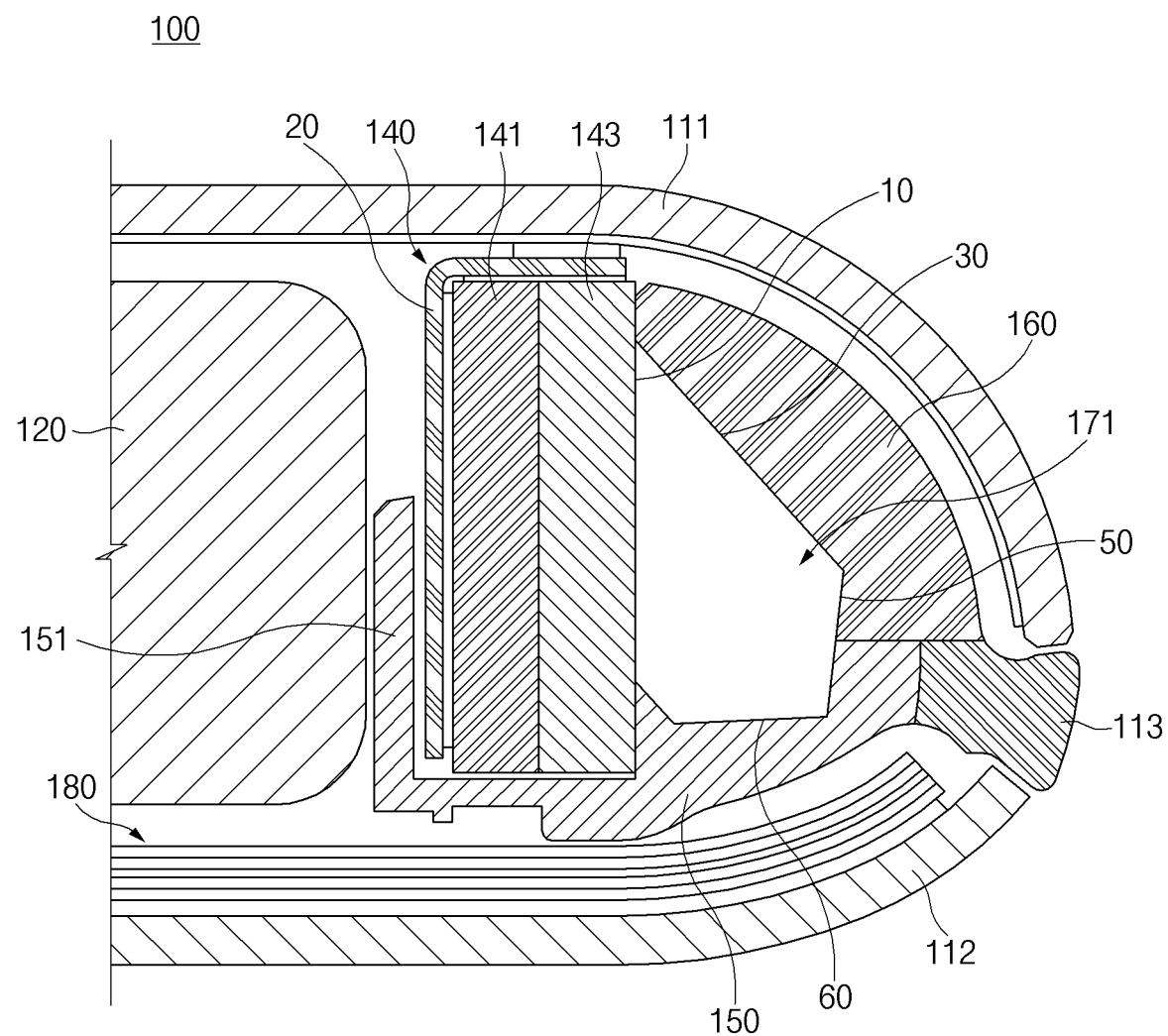
FIG. 3 is a sectional view of an electronic device according to a second embodiment.
Figure 4:
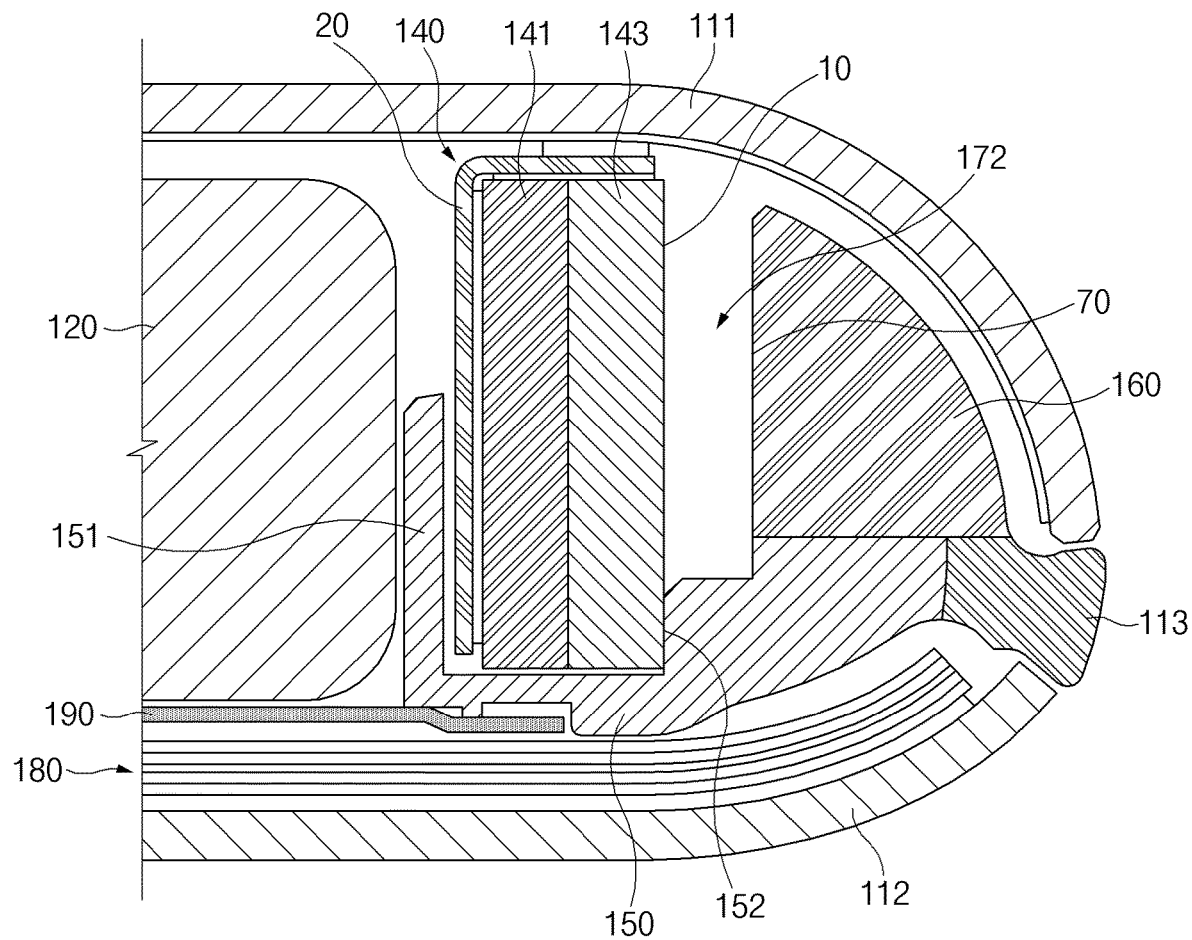
FIG. 4 is a sectional view of an electronic device according to a third embodiment.

FIG. 3 is a sectional view of an electronic device according to a second embodiment, and FIG. 4 is a sectional view of an electronic device according to a third embodiment. FIGS. 3 and 4 may illustrate the electronic devices in which the first plate 111 (see FIG. 1), the second plate 112 (see FIG. 1), and a side member 113 (see FIG. 1) are coupled to each other. The cross sections may be taken along direction A-A' illustrated in FIG. 1. Corresponding components of the electronic device 100 in FIGS. 1-4 share the same element numerals, and duplicated descriptions thereof will be omitted below. Accordingly, referring to FIGS. 3 and 4, it can be understood that the components assigned with the same reference numerals as those in FIGS. 1-2B have the same structure or functional features unless otherwise specified.

Referring to FIG. 3, the at least one groove 171 formed in the support member 150 and the polymer structure 160, when they are coupled to each other, may have various shapes depending on how parts of the support member 150 and the polymer structure 160 are removed through the air gap-creating process. That is, the machining tool used in the creation of the at least one groove 171 may include heads of various shapes. For example, the head of the machining tool may have a conical shape where the end is inclined with a specific inclination. In this case, the shape of the at least one groove 171 may be defined by the third surface 30 of the polymer structure 160 forming an acute angle with respect to the first surface 10 of the antenna structure 140, and a fifth surface 50 and a sixth surface 60 formed corresponding to the conical shape of the end of the machining tool. In an embodiment, in the cross section shown in FIG. 3, the fifth surface 50 may form an obtuse angle with respect to the third surface 30, and the sixth surface 60 may form an acute angle with respect to the third surface 30. According to an embodiment, the machining tool may be designed be applied to a specific depth such that the fifth surface 50 is disposed on parts of the support member 150 and the polymer structure 160.

According to an embodiment, the shape of the at least one groove 171 as described above may be modified depending on testing how the at least one groove 171 affects signals radiated from the antenna structure 140. For example, using machining tool with variously-shaped heads, grooves having various shapes may be formed in the support member 150 and the polymer structure 160, and signal radiation performance of the antenna structure 140 can be measured with respect to the variously-shaped grooves. The groove with the best performance may be selected. Through this operation, the mechanical stiffness of a particular surface formed by the at least one groove (e.g., the surface including the boundary of the support member 150 and the polymer structure 160) is additionally considered, so the optimal shape of the at least one groove may be determined.

Referring to FIG. 4, in another embodiment, at least one groove 172, which is open in at least one direction (e.g., a direction opposite to the third direction of FIG. 1 and/or the first direction of FIG. 1), may be formed in the support member 150 and the polymer structure 160. This type of groove 172 may be realized by applying the machining tool in the direction facing the second plate 112 (e.g., the second direction of FIG. 1), such that portions of the polymer structure 160 and the support member 150 making contact with the first surface 10 of the antenna structure 140 are removed (or cut out) by a specific width or a specific thickness. As shown in FIG. 4, in one embodiment, all of the portion of the polymer structure 160 making contact with the first surface 10 is removed, while only a step cut-out is made in the support member 150, such that a portion of the support member 150 is still making contact with the first surface 10. Accordingly, the polymer structure 160 may include a seventh surface 70 formed by removal of the above-mentioned portion of the polymer structure 160 making contact with the first surface 10 of the antenna structure 140. The seventh surface 70 may be spaced apart from the first surface 10 of the antenna structure 140 by a distance corresponding to the removed width or thickness.

According to an embodiment, within the housing of the electronic device 100 there may be a battery support member 190 to support the battery 120 disposed closely to the antenna structure 140 while the rib 151 is between the antenna structure 140 and the battery 120. For example, the battery support member 190 may be coupled (e.g., welded) to one area of the support member 150 extending inward of the housing, between the first plate 111 and the second plate 112. Alternatively, the battery support member 190 may be integrated with the support member 150 as a single component to support the battery 120.

Figure 5A:
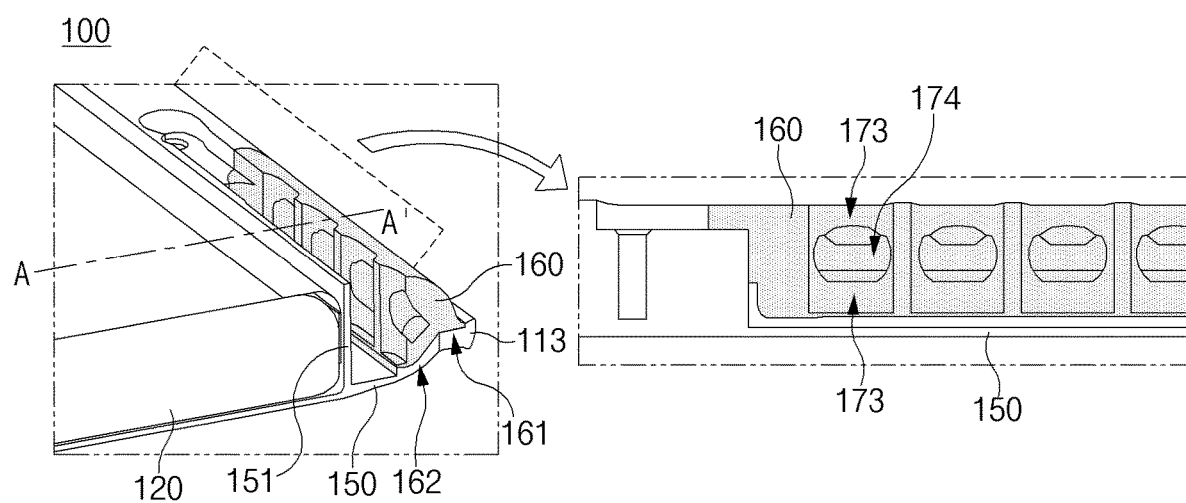
FIG. 5A is a view illustrating a rear surface of an electronic device according to another embodiment.
Figure 5B:
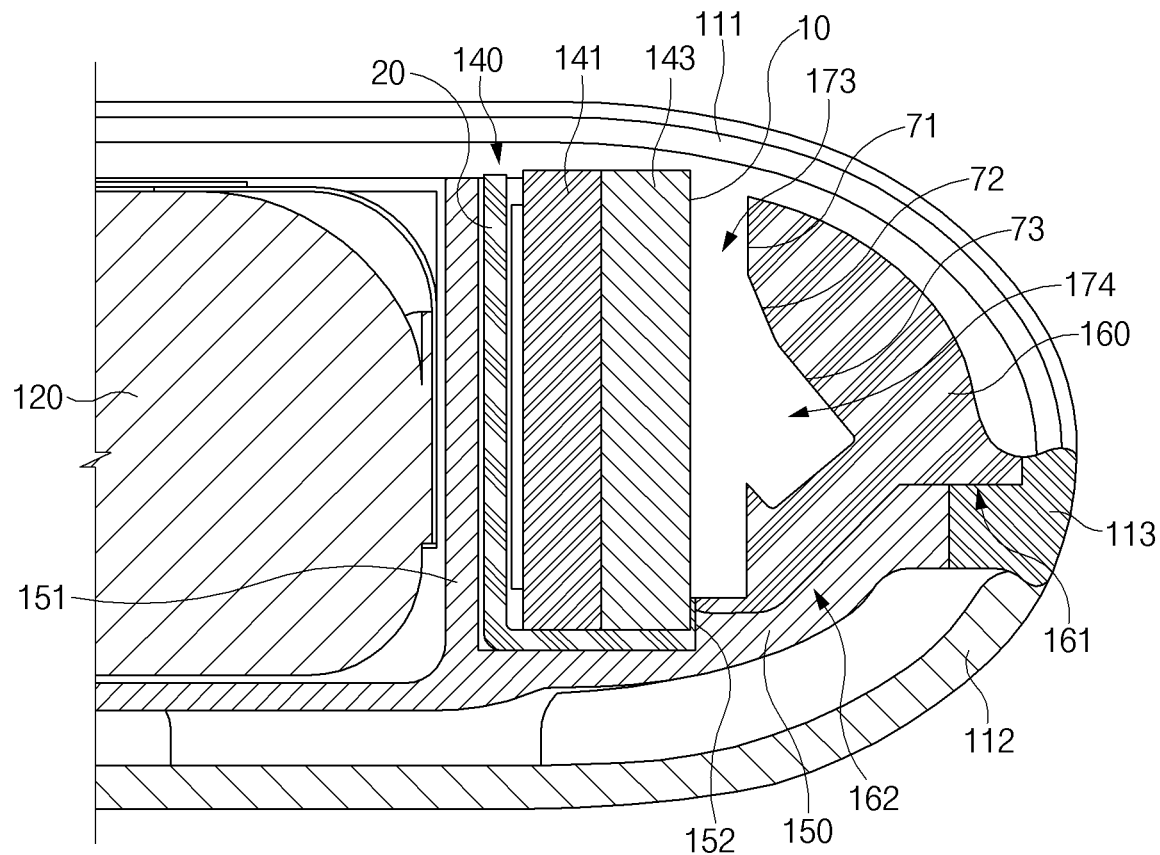
FIG. 5B is a sectional view of an electronic device taken along line A-A' of FIG. 5A, according to a fourth embodiment.
Figure 5C:
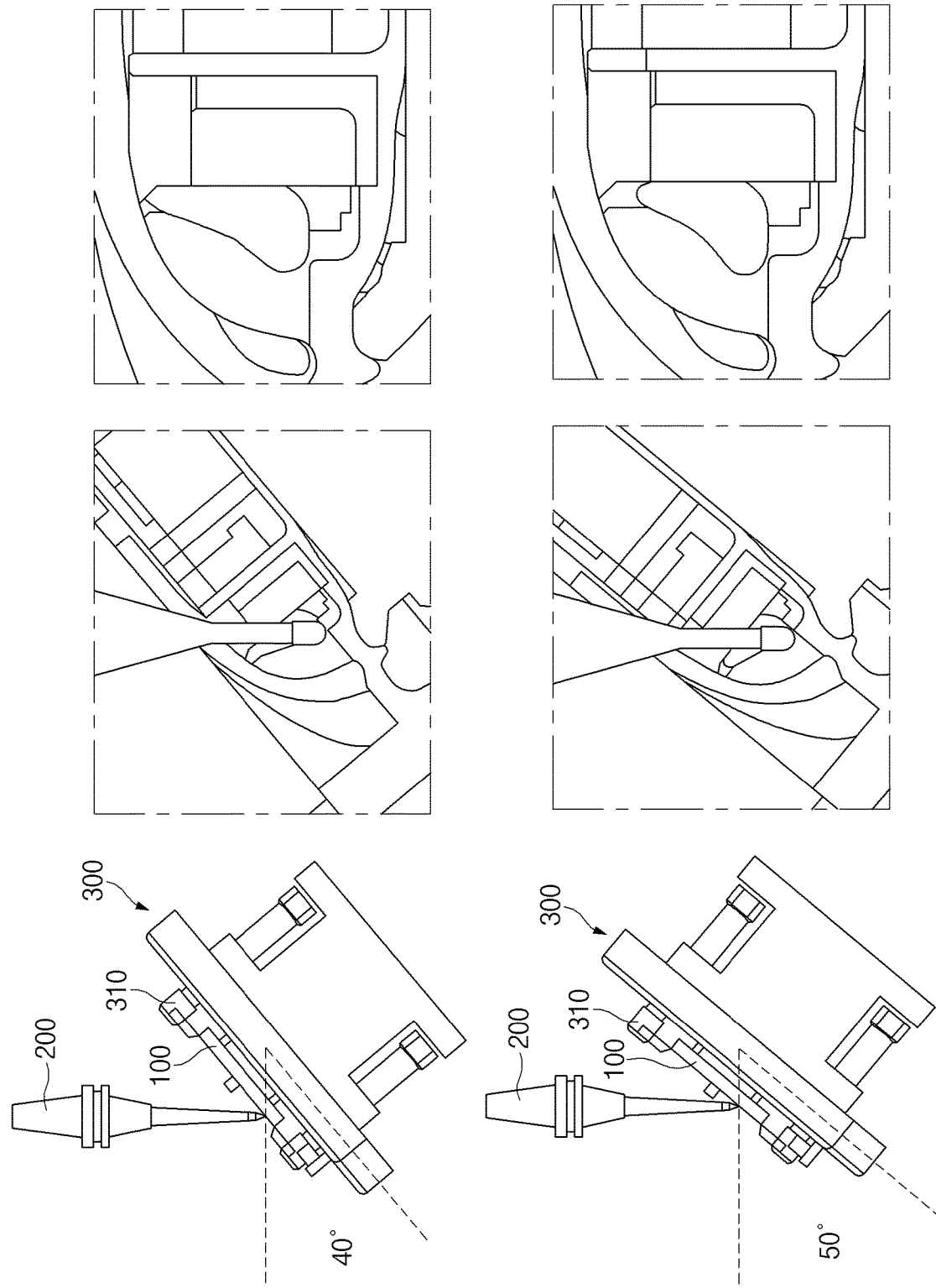
FIG. 5C is a view illustrating the applying of a machining tool to the electronic device, according to the fourth embodiment.

FIG. 5A is a view illustrating a rear surface of an electronic device according to another embodiment, FIG. 5B is a sectional view of an electronic device taken along line A-A' of FIG. 5A according to a fourth embodiment, and FIG. 5C is a view illustrating the applying of the machining tool to the electronic device according to the fourth embodiment. In FIG. 5A, the first plate 111 (see FIG. 1) is removed for illustration purposes. In FIG. 5B, the first plate 111, the second plate 112 (see FIG. 1), and the side member 113 (see FIG. 1) are coupled. Corresponding components of the electronic device 100 in FIGS. 1-5B share the same element numerals, and duplicated descriptions thereof will be omitted below. Accordingly, referring to FIGS. 5A and 5B, it can be understood that the components assigned with the same reference numerals as those in FIGS. 1-4 have the same structure or functional features unless otherwise specified.

Referring to FIGS. 5A and 5B, according to an embodiment, the polymer structure 160 may include one area coupled to the support member 150 and having the shape of protruding by a specific length toward the second plate 112 (e.g., the second direction of FIG. 1). For example, the polymer structure 160 may include a flat first area 161 coupled to a boundary area between the side member 113 and the support member 150, and a second area 162 extending inward of the housing of the electronic device 100 from the first area 161. The second area 162 may have the shape of protruding with a specific inclination toward the second plate 112. In this case, the support member 150 coupled to the polymer structure 160 may be in the shape corresponding to the flat shape and the protruding shape of the polymer structure 160. Due to the protrusion of the polymer structure 160, the previously-shown step 152 of the support member 150 may have its height reduced or be removed entirely.

According to an embodiment, the polymer structure 160 having the above-described shape may include at least one first groove 173 and at least one second groove 174 to support beamforming by the antenna structure 140 installed (or mounted) on the support member 150. In other words, according to an embodiment described with reference to FIGS. 5A and 5B, the at least one first groove 173 or 174 may be formed only in the polymer structure 160 and not in the support member. In one embodiment, the at least one groove 173 may be realized by applying the machining tool in a direction facing the second plate 112 (e.g., the second direction of FIG. 1), such that at least a portion of the surface of the polymer structure 160 making contact with the first surface 10 of the antenna structure 140 are removed (or cut out) by a specific width or a specific thickness. This may be similar to at least one groove 172 described above with reference to FIG. 4. Accordingly, the polymer structure 160 may include an eighth surface 71 formed by this operation. In an embodiment, the at least one second groove 174 may be formed by removing a portion of the polymer structure 160 by the machining tool applied to the polymer structure 160 at a specific inclination.

In the embodiment described above with reference to FIG. 5B, the section of the electronic device 100 is illustrated along line A-A' in FIG. 5A. Although not shown in FIG. 5B, a cross section may be made along a line parallel to A-A' but in which the at least one first groove 173 is not made. In this cross section, the polymer structure 160 makes contact with the first surface 10 of the antenna structure 140.

Referring to FIGS. 5B and 5C, the inclination of a machining tool 200 may be changed when it is applied to form the at least one second groove 174. Accordingly, the at least one second groove 174 may include a ninth surface 72 formed as the machining tool 200 is applied with the first inclination and a tenth surface 73 formed as the machining tool 200 is applied with the second inclination.

According to an embodiment, the variation in the inclination for applying the machining tool 200 results in the eighth surface 71, the ninth surface 72, and the tenth surface 73 forming a relatively gentle curve.

According to an embodiment, for example, the rib 151 may extend from the support member 150 with the height substantially similar to the thickness (or the height) of the battery 120 adjacent to the rib 151 to stably support or fix the battery 120 adjacent to the rib 151.

In an embodiment, the machining tool 200 may be applied to the polymer structure 160 by fixing the electronic device 100 on a die 300 using at least one jig 310. The inclination of the die 300 is adjustable, and the machining tool 200 is vertically moved from above the die 300 to be applied to the polymer structure 160. In this operation, the inclination of the die 300 may be one that avoids locking between the machining tool 200 and the rib 151. For example, when the inclination of the die 300 is 40 degrees, locking between the machining tool 200 and the rib 151 may be avoided, but at the same time the at least one groove 174 may be formed by the machining tool 200 as it is introduced to the polymer structure 160. On the other hand, if the inclination of the die 300 is 50 degrees, locking between the machining tool 200 and the rib 151 may occur such that part of the rib 151 may be accidentally removed by the machining tool. In this case, the height of the rib 151 may be reduced, and it may not support the battery 120 as well. Accordingly, the inclination of the die 300 may be determined to be in the range of 40 degrees to 50 degrees when the machining tool 200 is applied. As explained in connection with FIG. 5B, the inclination of the die 300 may change when forming the at least one second groove 174. The embodiment shown in FIG. 5C is only an example, and the instant disclosure is not limited to the range of 40-50 degrees. For example, the range may vary depending on the height of the rib 151 or the distance between the rib 151 and the polymer structure 160.

Figure 6A:
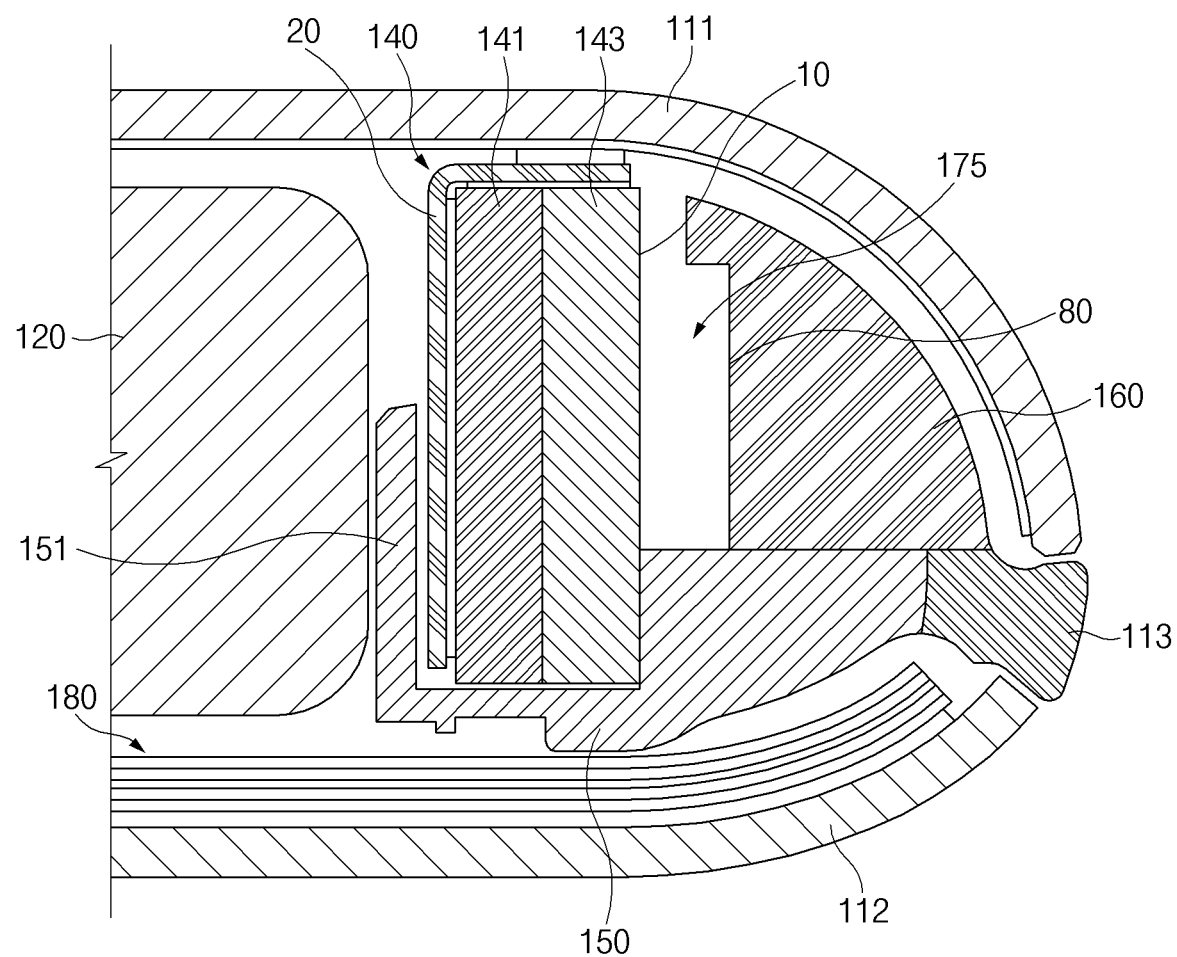
FIG. 6A is a sectional view of an electronic device taken along line A-A' of FIG. 1, according to a fifth embodiment.
Figure 6B:
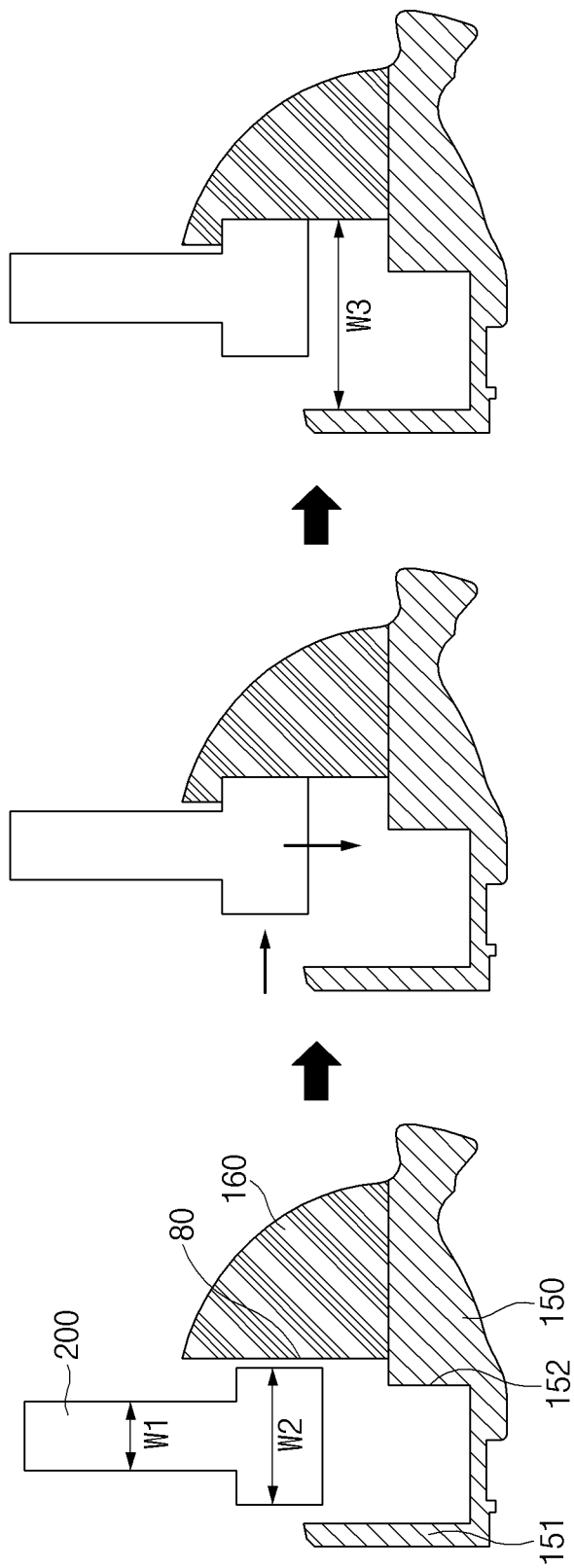
FIG. 6B is a view illustrating a machining process of the electronic device, according to the fifth embodiment.

FIG. 6A is a sectional view of an electronic device along line A-A' of FIG. 1 according to a fifth embodiment, and FIG. 6B is a view illustrating a machining process of the electronic device according to the fifth embodiment. FIG. 6A illustrates the electronic device when the first plate 111 (see FIG. 1), the second plate 112 (see FIG. 1), and the side member 113 (see FIG. 1) are coupled to each other. Corresponding components of the electronic device 100 in FIGS. 1-6B share the same element numerals, and duplicated descriptions thereof will be omitted below. Accordingly, referring to FIGS. 6A and 6B, it can be understood that the components assigned with the same reference numerals as those in FIGS. 1-5B have the same structure or functional features unless otherwise specified.

Referring to FIGS. 6A and 6B, as one surface of the polymer structure 160 making contact with the first surface 10 of the antenna structure 140 is removed (or cut out), in a space formed by the side member 113, the support member 150, the antenna structure 140, and the first plate 111, at least one groove 175 may be formed in the polymer structure 160. The groove 175 may be referred to as a recess that is recessed into a portion of the polymer structure 160.

Regarding the process of forming the at least one groove 175, the machining tool 200 including a body having a specific width W1 (e.g., 1.2 mm) and a head having a specific width W2 (e.g., 2.4 mm) is introduced between the rib 151 and the polymer structure 160 and is moved down as part of a first process while being spaced apart from the rib 151 by a specific distance (e.g., 0.15 mm), such that the portion of the polymer structure 160 aligned with the step 152 of the support member 150 (not shown) may be removed. After being moved down, the machining tool 200 is then moved back up and moved as part of a second process by a specific distance (e.g., 0.5 mm) toward the side member 113. Thereafter, the machining tool 200 is moved down as part of a third process to the boundary between the support member 150 and the polymer structure 160 to remove (cut out) a portion of the eleventh surface 80 of the polymer structure 160. Accordingly, a recess or groove 175 toward the side member 113 may be generated in the polymer structure 160. According to an embodiment, the width W3 from the rib 151 of the support member 150 to the newly-recessed eleventh surface 80 may be the sum of the distance (e.g., 2.7 mm) between the rib 151 and the step 152, the thickness of the removed part of the polymer structure 160 in the first process, and the moved distance of the machining tool 200 toward the side member 113 in the second process.

Figure 7A:
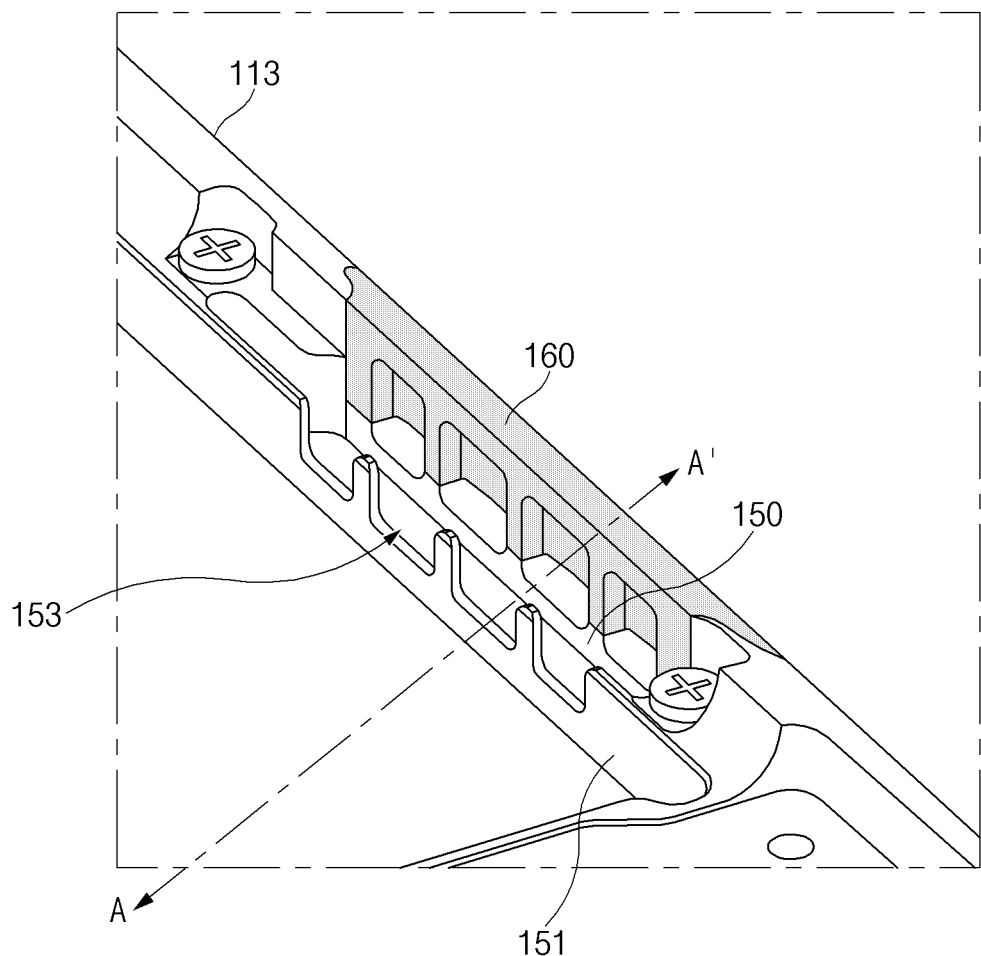
FIG. 7A is a view illustrating the arrangement space of an antenna structure of an electronic device, according to a sixth embodiment.
Figure 7B:
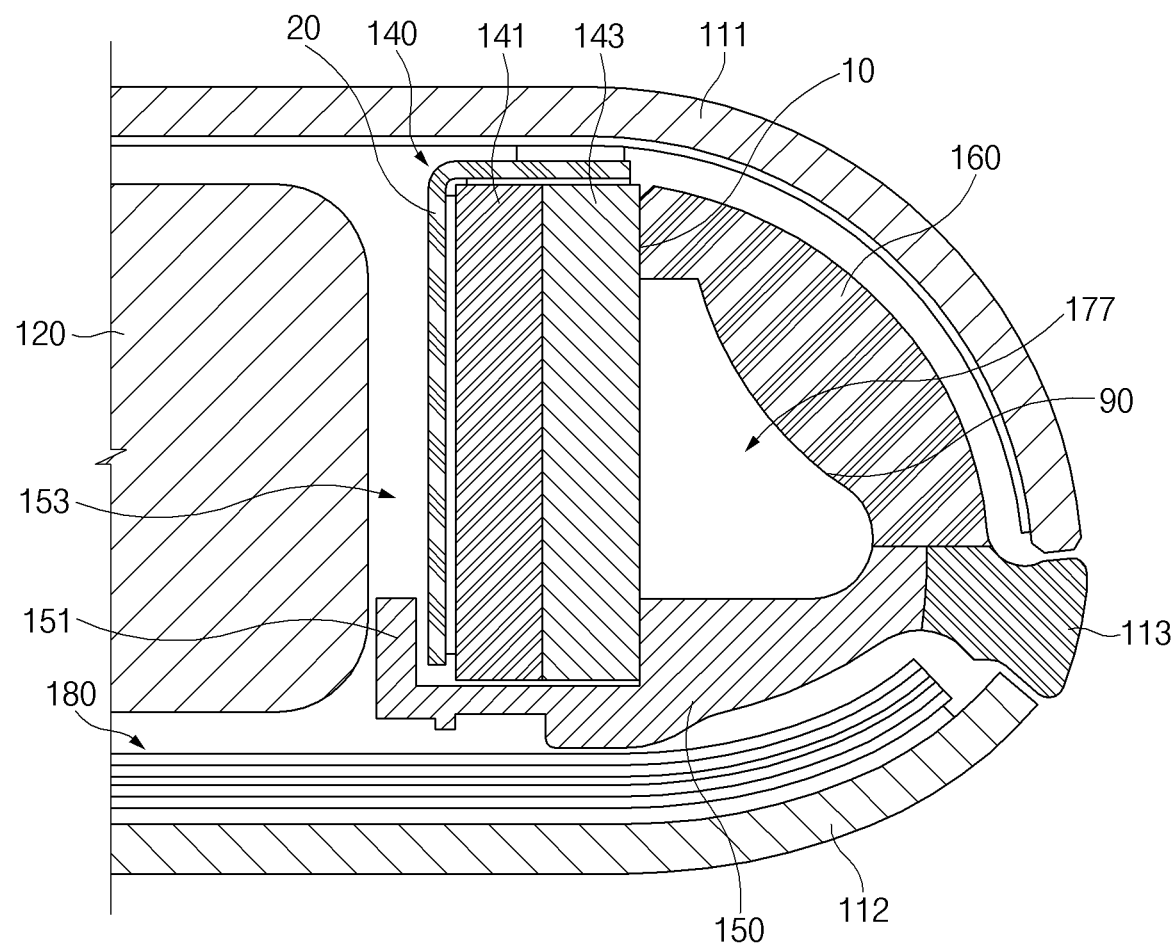
FIG. 7B is a sectional view of the electronic device taken along line A-A' of FIG. 7A, according to the sixth embodiment.

FIG. 7A is a view illustrating the arrangement space of an antenna structure of an electronic device according to a sixth embodiment, and FIG. 7B is a sectional view of the electronic device taken along line A-A' in FIG. 7A according to the sixth embodiment. In FIG. 7A, the first plate 111 (see FIG. 1) is removed. In FIG. 7B, the first plate 111, the second plate 112 (see FIG. 1), and the side member 113 (see FIG. 1) are coupled. Corresponding components of the electronic device 100 in FIGS. 1-7B share the same element numerals, and duplicated descriptions thereof will be omitted below. Accordingly, referring to FIGS. 7A and 7B, it can be understood that the components assigned with the same reference numerals as those in FIGS. 1-6B have the same structure or functional features unless otherwise specified.

Referring to FIGS. 7A and 7B, the head of the machining tool 200 applied to the support member 150 and the polymer structure 160, when they are coupled to each other, may have a curved shape. In this case, at least one groove 177 formed in the support member 150 and the polymer structure 160 may include a twelfth surface 90 curved in at least a portion thereof corresponding to the head of the machining tool 200. In an embodiment, the machining tool 200 may be applied to a specific depth or height such that the twelfth surface 90 is disposed on parts of the support member 150 and the polymer structure 160.

In an embodiment, the rib 151 formed on the support member 150, as compared to previous embodiments, may be partly removed so that its height is reduced. This is to ensure that the machining tool can be properly applied to the support member 150 and the polymer structure 160. Accordingly, the rib 151 of the support member 150 may include at least one opening 153 serving as an area corresponding to at least one groove 177. According to an embodiment, instead of using a head with a curved surface, the twelfth surface 90 may be formed by a machining tool with a flat head. In this embodiment, the inclination at which the machining tool is applied may be gradually altered to create the curved surface of the groove 177.

Figure 8:
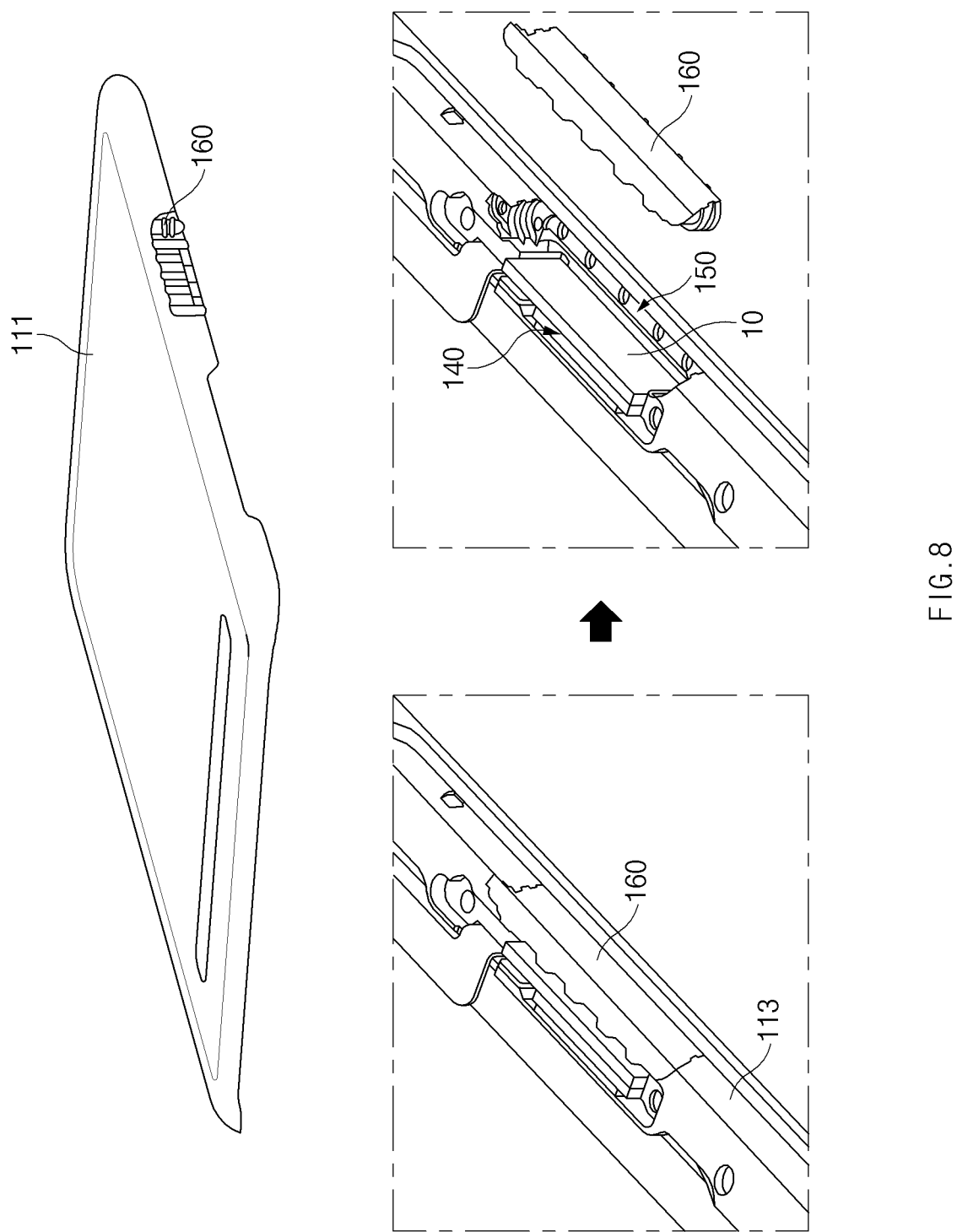
FIG. 8 is a view illustrating the rear surface of an electronic device, according to still another embodiment.

FIG. 8 is a view illustrating the rear surface of an electronic device, according to still another embodiment.

Referring to FIG. 8, the polymer structure 160 making up part of the side member 113 may be separated from the side member 113 and may be included in one area of the first plate 111 (e.g., the rear plate). For example, the polymer structure 160 may be disposed to be matched with the support member 150 at a specific section of the side member 113 when the first plate 111 is coupled to the side member 113. The polymer structure 160 may be inserted into an inner area of the edge of the first plate 111 curved with a specific curvature. According to an embodiment, the polymer structure 160 included in the inner area of the edge of the first plate 111 may be coupled to the first plate 111 or may be formed integrally with the first plate 111. In an embodiment, the polymer structure 160 included in the first plate 111 may include at least one groove forming a specific inclination with respect to the first surface of the antenna structure 140 (e.g., reference numeral 10 of FIG. 2B) or at least one groove parallel to the first surface 10. In addition, due to the grooves, the polymer structure 160 may support signal radiation of the antenna structure 140.

FIG. 9 is a view illustrating an antenna structure according to an embodiment.

Referring to FIG. 9, the antenna structure 140 according to an embodiment may include the shielding member 141 (e.g., a shield can) described above and the printed circuit board 143 having at least one antenna pattern (e.g., a dipole antenna pattern and a patch antenna pattern), and may further include a heat radiation member 145 and a flexible printed circuit board 147. According to one embodiment, the heat radiation member 145 may be formed to surround at least a portion of the shielding member 141 and the printed circuit board 143, which are coupled to each other. Accordingly, the second surface 20 (see FIG. 2B) of the above-described antenna structure 140 may be understood as one surface of the heat radiation member 145. For example, one surface of the heat radiation member 145 makes contact with the shielding member 141, and another surface bent and extending from that surface may make contact with the bottom surface of each of the shielding member 141 and the printed circuit board 143. Alternatively, the one surface of the heat radiation member 145 makes contact with the shielding member 141, and another surface of the heat radiation member 145, which is bent and extending from that one surface, may make contact with the top surface of each of the shielding member 141 and the printed circuit board 143. In an embodiment, the heat radiation member 145 may include at least one hole 146 for receiving a screw that couples the antenna structure to the support member 150, for example as shown in FIG. 2B. In an embodiment, the heat radiation member 145 may be made with materials (e.g., copper) having excellent thermal conductivity to conduct heat generated from the shielding member 141 or the printed circuit board 143 away from the shielding member 141 or the printed circuit board 143. In one embodiment, the flexible printed circuit board 147 may be electrically connected with a communication circuitry included in the electronic device 100. A portion of the flexible printed circuit board 147 may be disposed between the heat radiation member 145 and the shielding member 141 so that the flexible printed circuit board 147 can be electrically connected with the printed circuit board 143. The flexible printed circuit board 147 may transmit signal or data from at least one dipole antenna pattern and at least one patch antenna pattern included in the printed circuit board 143 to the communication circuitry and vice versa, thereby supporting the transmitting or receiving of signals having specific frequency bands (e.g., the frequency band in the range of 3 GHz and 100 GHz) using the antenna structure 140.

Figure 10:
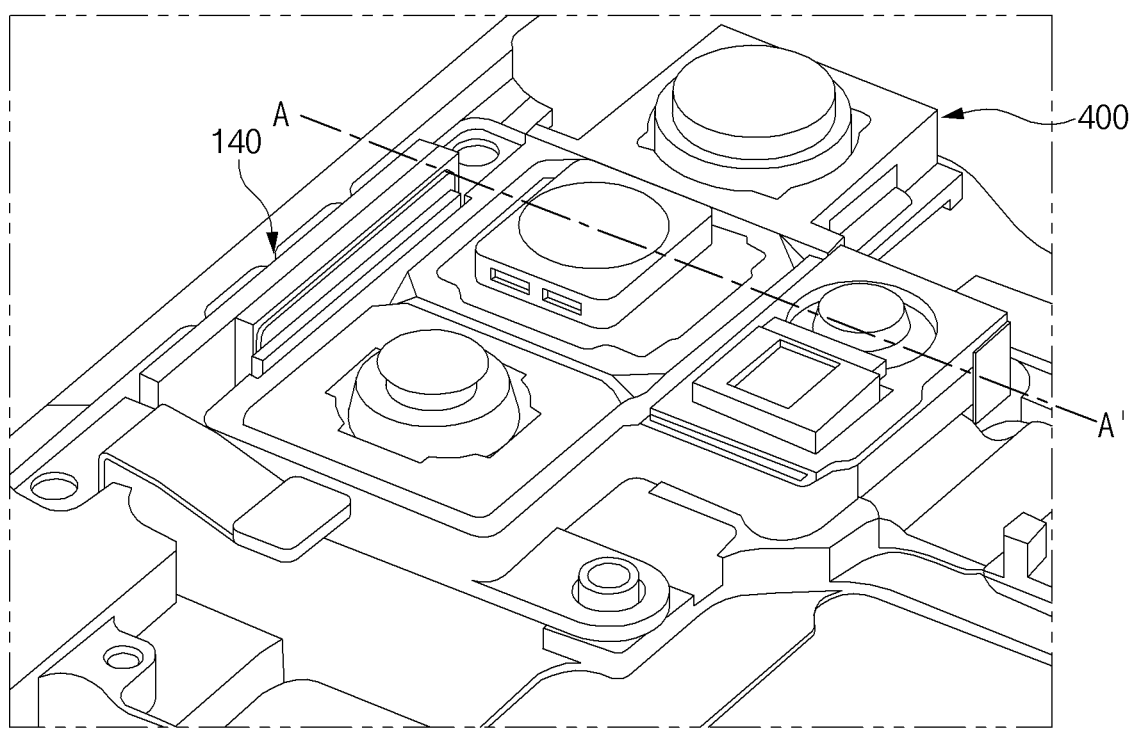
FIG. 10 is a view illustrating a rear surface of an electronic device, according to still another embodiment.
Figure 11:
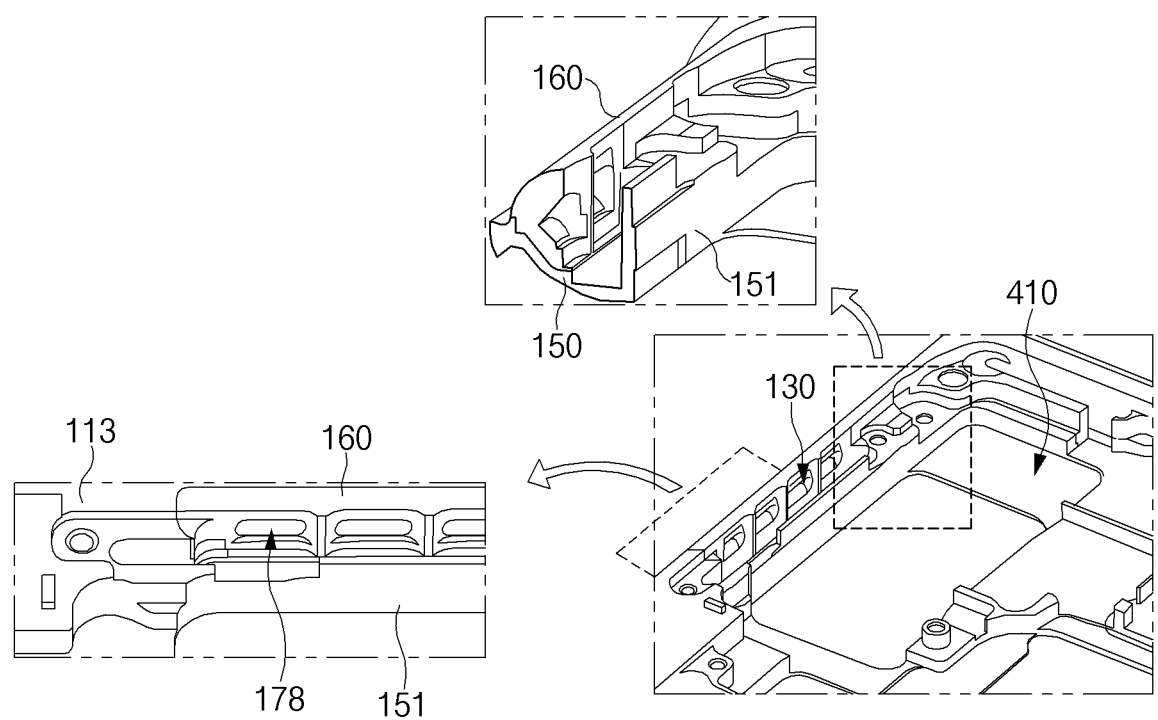
FIG. 11 is a view illustrating the arrangement space of an antenna structure of an electronic device, according to a seventh embodiment.
Figure 12:
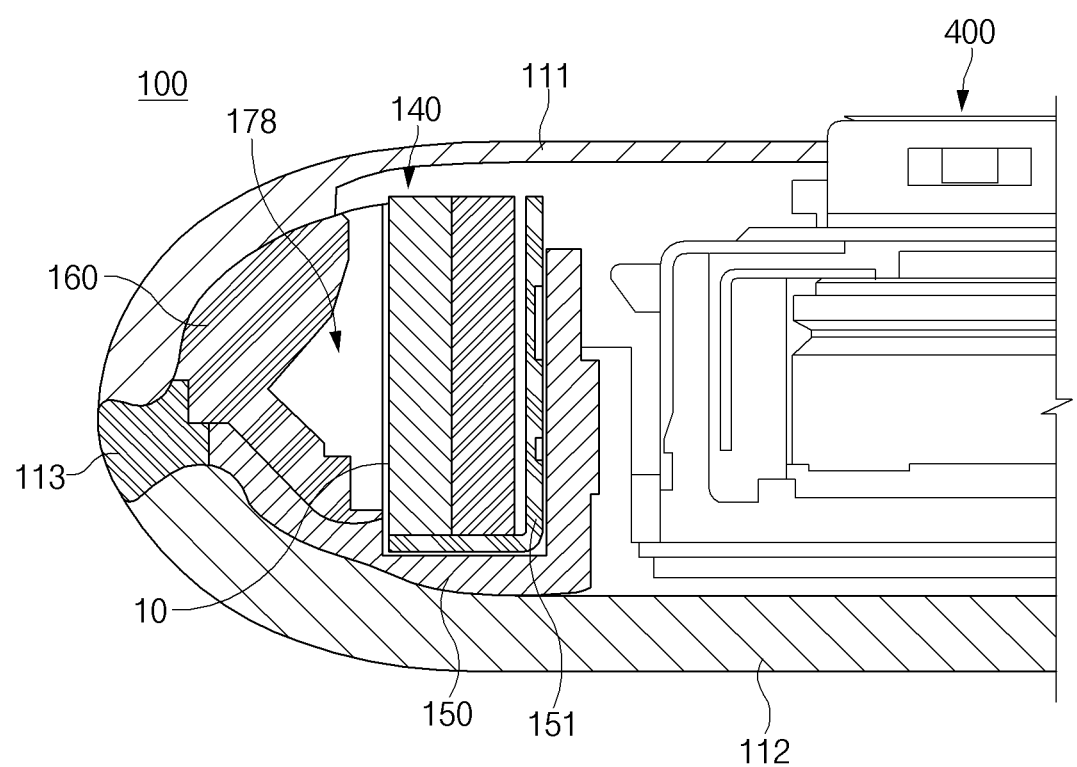
FIG. 12 is a sectional view of the electronic device taken along line A-A' of FIG. 10, according to the seventh embodiment.

FIG. 10 is a view illustrating a rear surface of an electronic device according to still another embodiment, FIG. 11 is a view illustrating the arrangement space of an antenna structure of an electronic device according to a seventh embodiment, and FIG. 12 is a sectional view of the electronic device taken along line A-A' of FIG. 10 according to the seventh embodiment. In FIGS. 10 and 11, for illustration purposes, the first plate 111 (see FIG. 1) is removed. In FIG. 12, the first plate 111, the second plate 112 (see FIG. 1), and a side member 113 (see FIG. 1) are coupled. Corresponding components of the electronic device 100 in FIGS. 1-12 share the same element numerals, and duplicated descriptions thereof will be omitted below. Accordingly, referring to FIGS. 10-12, it can be understood that the components assigned with the same reference numerals as those in FIGS. 1-9 have the same structure or functional features unless otherwise specified.

Referring to FIGS. 10, 11, and 12, according to an embodiment, the antenna structure 140 may be further disposed in the cavity area 130 (hereinafter, referred to as a second cavity area) formed at the upper end of the left edge of the electronic device 100, in addition to the cavity area 130 of FIG. 1 (hereinafter referred to as a "first cavity area") formed at the lower end of the right edge of the electronic device 100. According to an embodiment, at least one camera module 400 may be disposed in an area adjacent to the second cavity area 130. In this regard, the rib 151, which is bent at a specific angle (e.g., substantially vertically) toward the first plate 111 from one area of the support member 150, may separate the second cavity area 130 from an area 410 for disposing at least one camera module 400 and may support or fix at least a portion of each of the antenna structure 140 and at least one camera module 400. Alternatively, the rib 151 may block heat generated from the antenna structure 140 from being conducted to the space adjacent to the at least one camera module 400. At least one groove that may be formed without removing the rib 151 may be employed in the polymer structure 160 facing the antenna structure 140.

In an embodiment, the polymer structure 160 coupled to the support member 150 may include at least one groove 178 formed by removing at least a portion of the polymer structure 160. According to an embodiment, the at least one groove 178 may be formed in a process similar to the process described in connection to FIGS. 5A and 5B. For example, the at least one groove 178 may be formed by first applying the machining tool in the direction facing the second plate 112 (e.g., the second direction of FIG. 1) to remove (or cut out) a portion of the surface of the polymer structure 160 making contact with the first surface 10 of the antenna structure 140. Then, the machining tool may be applied with a specific inclination with respect to the removed surface of the polymer structure 160. Alternatively, according to various embodiments, the at least one groove 178 may be formed using a process similar to the processes described in connection with FIGS. 2B, 3, 4, 6A, and/or 7B.

As described above, according to an embodiment, the electronic device 100 may including a housing including a first plate 111 having an external surface facing in a first direction, a second plate 112 having an external surface facing in a second direction opposite to the first direction, and a side member 113 surrounding a first space between the first plate and the second plate and coupled to the second plate or integrated with the second plate, a support member 150 coupled to the side member or integrated with the side member, interposed between the first plate and the second plate, and including a metallic structure, an antenna structure 140 interposed between the first plate and the support member, mounted on the support member, including a first surface (e.g., reference numeral 10 of FIG. 2B) facing in a third direction toward the side member, and including at least one antenna pattern configured to output a directional beam facing in the third direction, a polymer structure 160 disposed in a second space surrounded by the first plate, the support member, the side member, and the first surface of the antenna structure, and coupled to the metallic structure, and a wireless communication circuitry electrically connected with the antenna pattern and configured to transmit and/or receive a signal having a frequency between 3 GHz and 100 GHz.

According to an embodiment, the coupled metallic structure and polymer structure may include at least one groove bounded by the first surface, a second surface 30 (e.g., FIG. 2B) on the polymer structure forming an acute angle with the first surface, and a third surface 40 (e.g., FIG. 2B) substantially perpendicular to the second surface.

According to an embodiment, the antenna structure may be disposed at a lower area of a right edge of the electronic device when the electronic device is viewed in the second direction.

According to an embodiment, the support member and the polymer structure may be disposed at the lower area of the right edge of the electronic device.

According to an embodiment, the support member may include a step formed at one area extending away from the side member.

According to an embodiment, the support member may include a rib 151 formed at an end of the support member further away from the side member than the step, the rib extending from the end in the first direction.

According to an embodiment, the electronic device may further include the battery 120 disposed in a third space surrounded by the first plate, the second plate, and the support member, wherein the battery and the antenna structure are disposed on opposite sides of the rib.

According to an embodiment, the antenna structure may be mounted on the support member such that at least a portion of the first surface makes contact with the step of the support member, and at least a portion of a fourth surface, which is an opposite surface to the first surface, makes contact with the rib of the support member.

According to an embodiment, the polymer structure may include one area coupled to the metallic structure and another area coupled to the side member.

According to an embodiment, the first plate may include an edge area curved with a specific curvature and may extend in the second direction.

According to an embodiment, the polymer structure may include an area having a shape corresponding to a shape of the edge area of the first plate and making contact with the edge area of the first plate, and another area making contact with the first surface of the antenna structure.

According to an embodiment, the third surface may be disposed on at least a portion of the metallic structure and at least a portion of the polymer structure.

According to an embodiment, the at least one groove may be an air gap.

According to an embodiment, the antenna structure may include a patch antenna, a printed circuit board coupled to the at least one antenna pattern, a heat radiation member surrounding at least a portion of the printed circuit board and the patch antenna, and a flexible printed circuit board electrically connecting the patch antenna with the wireless communication circuitry.

As described above, according to an embodiment, an electronic device may include a housing including a first plate having an external surface facing in a first direction, a second plate having an external surface facing in a second direction opposite to the first direction, and a side member surrounding a first space between the first plate and the second plate, a support member coupled to the side member or integrated with the side member, interposed between the first plate and the second plate, and including a metallic structure, an antenna structure interposed between the first plate and the support member, mounted on the support member, including a first surface facing in a third direction toward the side member, and including at least one antenna pattern configured to output a directional beam facing in the third direction, a polymer structure coupled to the first plate or integrated with the first plate to be disposed in a second space surrounded by the first plate, the support member, the side member, and the first surface of the antenna structure, and coupled to the metallic structure, when the first plate and the side member are coupled to each other, and a wireless communication circuitry electrically connected with the antenna pattern and configured to transmit and/or receive a signal having a frequency between 3 GHz and 100 GHz.

According to an embodiment, the polymer structure may include at least one groove forming a specific inclination with the first surface of the antenna structure, when the first plate and the side member are coupled to each other.

According to an embodiment, the polymer structure may include at least one groove having a surface at an inclination with the first surface of the antenna structure, when the first plate and the side member are coupled to each other.

As described above, according to an embodiment, an electronic device may include a housing including a first plate having an external surface facing in a first direction, a second plate having an external surface facing in a second direction opposite to the first direction, and a side member surrounding a first space between the first plate and the second plate and coupled to the second plate or integrated with the second plate, a support member coupled to the side member or integrated with the side member, interposed between the first plate and the second plate, and including a metallic structure, an antenna structure interposed between the first plate and the support member, mounted on the support member, including a first surface facing in a third direction toward the side member, and including at least one antenna pattern configured to output a directional beam facing in the third direction, a polymer structure disposed in a second space surrounded by the first plate, the support member, the side member, and the first surface of the antenna structure, and coupled to the metallic structure, and a wireless communication circuitry electrically connected with the antenna pattern and configured to transmit and/or receive a signal having a frequency between 3 GHz and 100 GHz.

According to an embodiment, the coupled metallic structure and polymer structure may include at least one groove bounded by the first surface, a second surface on the polymer structure forming an acute angle with the first surface, a third surface forming an obtuse angle with the second surface; and a fourth surface forming an acute angle with the second surface.

According to an embodiment, the support member may include a step formed at one area extending away from the side member, and a rib formed at an end of the support member further away from the side member than the step, the rib extending from the end in the first direction.

According to an embodiment, the electronic device may further include a battery disposed in a third space surrounded by the first plate, the second plate, and the support member, wherein the battery and the antenna structure are disposed on opposite sides of the rib.

According to an embodiment, the antenna structure may be mounted on the support member such that at least a portion of the first surface makes contact with the step of the support member, and at least a portion of a fifth surface, which is an opposite surface to the first surface, makes contact with the rib of the support member.

Figure 13:
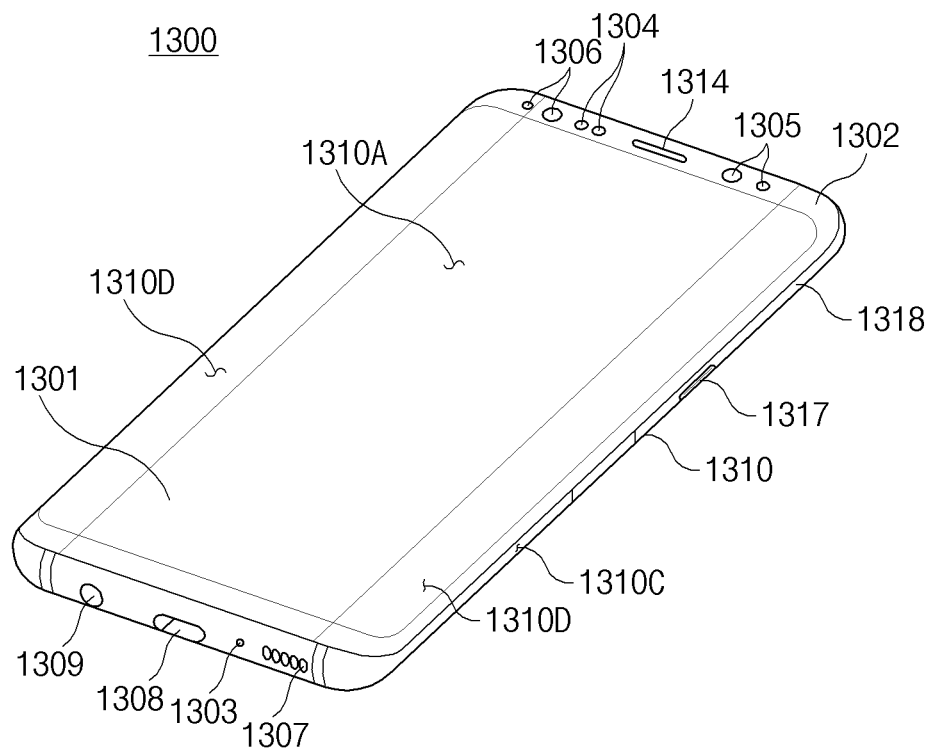
FIG. 13 is a front perspective view of an electronic device, according to an embodiment.
Figure 14:
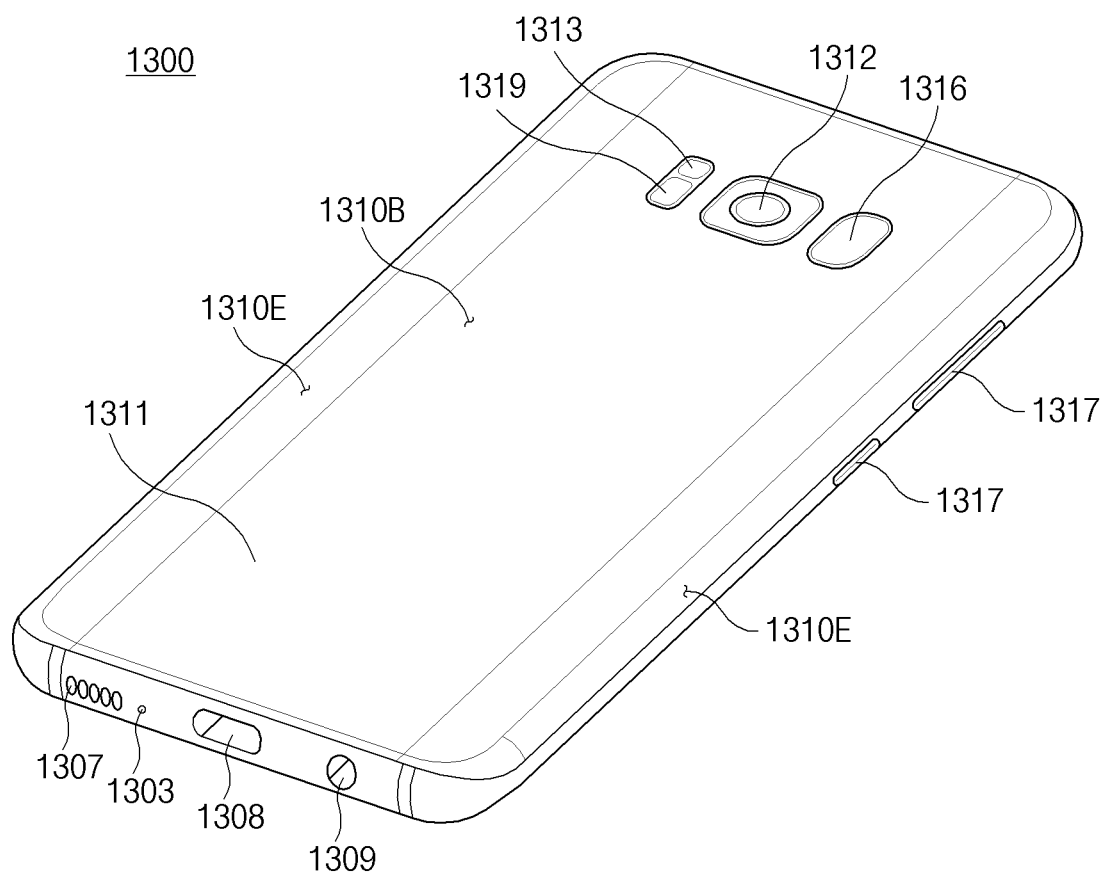
FIG. 14 is a rear perspective view of the electronic device, according to an embodiment.
Figure 15:
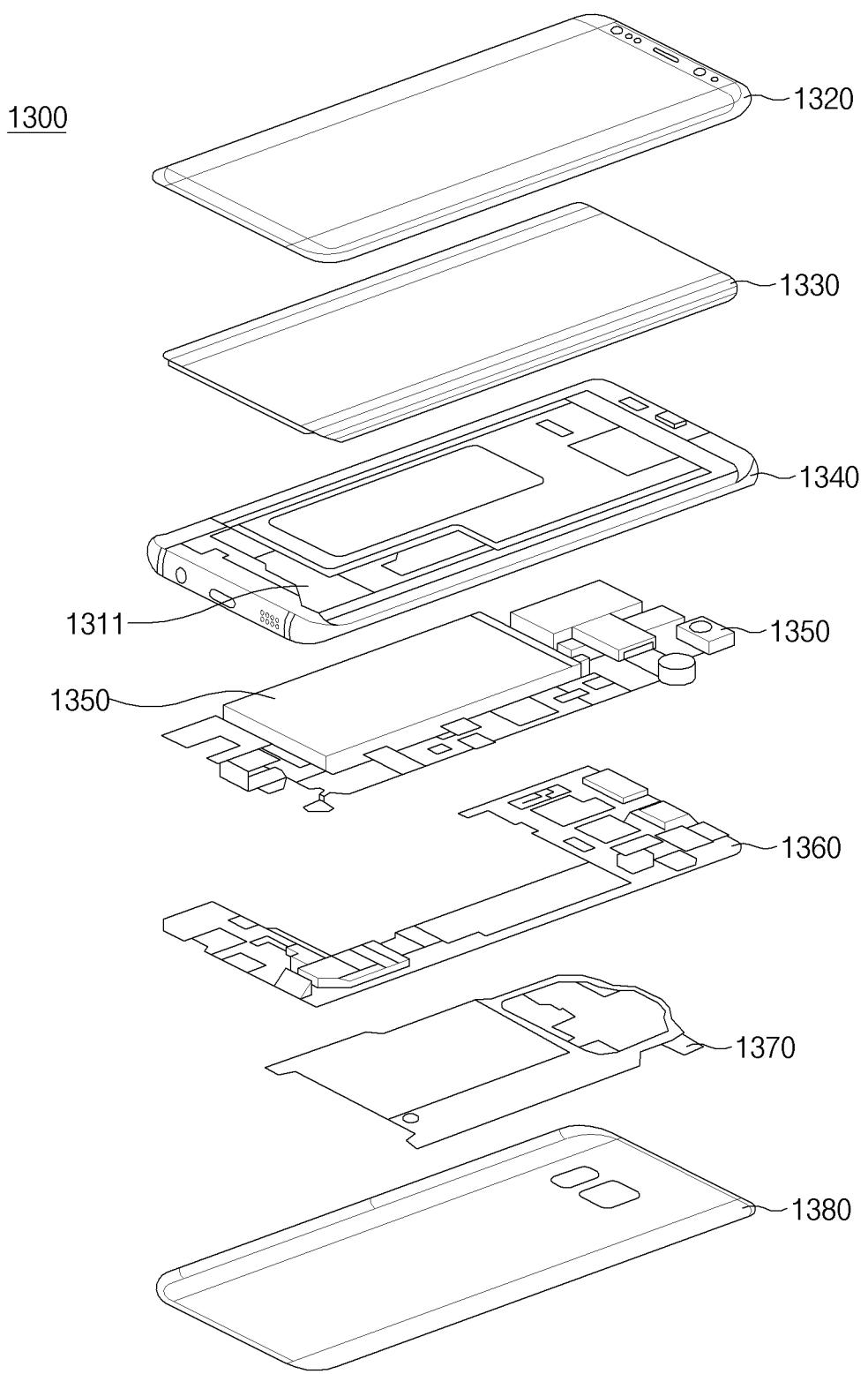
FIG. 15 is an exploded perspective view of the electronic device, according to an embodiment.

FIG. 13 is a front perspective view of an electronic device according to an embodiment, FIG. 14 is a rear perspective view of the electronic device according to an embodiment, and FIG. 15 is an exploded perspective view of the electronic device according to an embodiment.

Referring to FIGS. 13 and 14, according to an embodiment, an electronic device 1300 may include a housing 1310 including a first surface 1310A (or a front surface), a second surface 1310B (or a rear surface), and a side surface 1310C surrounding the space between the first surface 1310A and the second surface 1310B. In another embodiment (not illustrated), a housing may be referred to as the structure forming some of the first surface 1310A, the second surface 1310B, and the side surface 1310C of FIG. 1. According to an embodiment, the first surface 1310A may include a front plate 1302 (e.g., a glass plate or a polymer plate including various coating layers) substantially transparent in at least a portion thereof. The second surface 1310B may include a rear plate 1311 substantially opaque. The rear plate 1311 may include, for example, coated or colored glass, ceramic, polymer, metal (e.g., aluminum, stainless steel (STS), or magnesium) or the combination of the above materials. The side surface 1310C may include a side bezel structure (or "side member") 1318 which is coupled to the front plate 1302 and the rear plate 1311, and includes metal and/or polymer. In an embodiment, the rear plate 1311 and the side bezel structure 1318 may be formed integrally with each other and may include the same material (e.g., a metallic material such as aluminum).

In the illustrated embodiment, the front plate 1302 may include two first areas 1310D, which are bent toward the rear plate 1311 from the first surface 1310A while seamlessly extending, at opposite long edge ends of the front plate 1302. In an embodiment illustrated (see FIG. 14), the rear plate 1311 may include two second areas 1310E, which are bent toward the front plate 1302 from the second surface 1310B while seamlessly extending, at opposite long edge ends of the rear plate 1311. In an embodiment, the front plate 1302 (or the rear plate 1311) may include only one of the first areas 1310D (or the second areas 1310E). In another embodiment, some of the first areas 1310D or the second areas 1310E may not be included. In embodiments, when viewed from the side surface of the electronic device 1300, the side bezel structure 1318 may have a first thickness (or width) at the side surface having no first area 1310D or second area 1310E, and may have a second thickness thinner than the first thickness at the side surface including the first areas 1310D or the second areas 1310E.

According to an embodiment, the electronic device 1300 includes at least one of a display 1301, audio modules 1303, 1307 and 1314, sensor modules 1304, 1316 and 1319, camera modules 1305, 1312 and 1313, a key input device 1317, a light emitting device 1306, or connector holes 1308 and 1309. In an embodiment, the electronic device 1300 may omit at least one (e.g., the key input device 1317 or the light emitting device 1306) of components or may include other components.

The display 1301 may be exposed, for example, through a substantial portion of the front plate 1302. In an embodiment, at least a portion of the display 1301 may be exposed through the front plate 1302 including the first surface 1310A and the first areas 1310D of the side surface 1310C. In an embodiment, the edge of the display 1301 may be formed substantially identically to the shape of an adjacent outer shape of the front plate 1302. According to another embodiment (not illustrated), to expand an area for exposing the display 1301, the distance between an outer portion of the display 1301 and an outer portion of the front plate 1302 may be substantially uniformly formed.

In another embodiment (not illustrated), a recess or an opening is formed in a portion of a screen display area of the display 1301. In addition, at least one of the audio module 1314, the sensor module 1304, the camera module 1305, or the light emitting device 1306 aligned in line with the recess or the opening may be included in the portion of the screen display area of the display 1301. In another embodiment (not illustrate), at least one of the audio module 1314, the sensor module 1304, the camera module 1305, the fingerprint sensor 1316, or a light emitting device 1306 may be included in a rear surface of the screen display area of the display 1301. In another embodiment (not illustrated), the display 1301 may be coupled or disposed adjacent to a touch sensing circuit, a pressure sensor to measure the intensity (pressure) of a touch, and/or a digitizer to detect the stylus pen based on an electromagnetic scheme. In an embodiment, at least some of the sensor modules 1304 and 1319 and/or at least a portion of the key input device 1317 may be disposed in the first areas 1310D and/or the second areas 1310E The audio modules 1303, 1307, and 1314 may include the microphone hole 1303 and speaker holes 1307 and 1314. The microphone hole 1303 may have a microphone disposed therein to obtain an external sound. In an embodiment, the microphone hole 1303 may have a plurality of microphones disposed therein to sense the direction of a sound. The speaker holes 1307 and 1314 may include the external speaker hole 1307 and the receiver hole 1314 for conversation. In an embodiment, the speaker holes 1307 and 1314 and the microphone hole 1303 may be implemented into one hole or a speaker may be included without the speaker holes 1307 and 1314 (e.g., a piezoelectric speaker).

In an embodiment, the sensor modules 1304, 1316, and 1319 may generate electrical signals or data values corresponding to an internal operating state or an external environment state of the electronic device 1300. The sensor modules 1304, 1316 and 1319 may, for example, include the first sensor module 1304 (e.g., a proximity sensor) and/or a second sensor module (not illustrated) (e.g., a fingerprint sensor) disposed on the first surface 1310A of the housing 1310, and/or the third sensor module 1319 (e.g., a HRM sensor) and/or the fourth sensor module 1316 (e.g., a fingerprint sensor) disposed on the second surface 1310B of the housing 1310. The fingerprint sensor may be disposed on the second surface 1310B as well as the first surface 1310A (e.g., the display 1301) of the housing 1310. The electronic device 1300 may further include a sensor module (is not illustrated), for example, at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or the illuminance sensor 1304.

The camera modules 1305, 1312 and 1313 may include the first camera device 1305 disposed on the first surface 1310A of the electronic device 1300 and the second camera device 1312 and/or the flash 1313 disposed on the second surface 1310B. The camera devices 1305 and 1312 may include one or a plurality of lenses, an image sensor, and/or an image signal processor. The flash 1313 may include, for example, a light emitting diode or a xenon lamp. In an embodiment, two or more lenses (infrared camera, a wide angle lens, and a telephoto lens) and image sensors may be disposed on one surface of the electronic device 1300.

The key input device 1317 may be disposed on the side surface 1310C of the housing 1310. In another embodiment, the electronic device 1300 may not include some or an entire portion of the key input device 1317 and the key input device 1317 not included may be implemented in another form such as a soft key on the display 1301. In another embodiment, the key input device may include the sensor module 1316 disposed on the second surface 1310B of the housing 1310.

The light emitting device 1306 may be, for example, disposed on the first surface 1310A of the housing 1310. The light emitting device 1306 may provide, for example, the status information of the electronic device 1300 in an optical form. In another embodiment, the light emitting device 1306 may provide, for example, a light source operating together with the operation of the cameral module 1305. The light emitting device 1306 may include, for example, LED, IR LED, and Zenon lamps.

The connector holes 1308 and 1309 may include the first connector hole 1308 to receive a connector (e.g., a USB connector) to transceive power and/or data together with the external electronic device and/or the second connector hole (e.g., an ear-phone jack) 1309 to receive a connector to transceive an audio signal together with the external electronic device Referring to FIG. 15, the electronic device 1300 may include the side bezel structure 1318, a first support member 1311 (e.g., a bracket), a front plate 1320, a display 1330, a printed circuit board 1340, a battery 1350, a second support member 1360 (e.g., a rear case), an antenna 1370 and a rear plate 1380. In an embodiment, the electronic device 1300 may omit at least one (e.g., the first support member 1311 or the second support member 1360) of components or may additionally include other components. At least one of components of the electronic device 1300 may be identical to or similar to at least one of components of the electronic device 1300 of FIG. 13 or FIG. 14, and the duplicated description thereof will be omitted.

The first support member 1311 is disposed in the electronic device 1300 to be coupled to the side bezel structure 1318 or to be integrated with the side bezel structure 1318. The first support member 1311 may include, for example, a metallic material and/or a non-metallic material (e.g., polymer). The first support member 1311 may have one surface coupled to the display 1330 and an opposite surface coupled to the printed circuit board 1340. A processor, a memory, and/or an interface may be mounted on the printed circuit board 1340. The processor may include, for example, one or more of a central processing unit, an application processor, a graphic processing unit, an image signal processor, a sensor hub processor, or a communication processor The memory may include, for example, a volatile memory and/or a non-volatile memory.

The interface may include, for example, a high definition multimedia interface (HDMI), a universal serial bus (USB) interface, an SD card interface, and/or an audio interface. The interface may, for example, electrically or physically connect the electronic device 1300 with the external electronic device and may include a USB connector, an SD card/MMC connector, or an audio connector.

The battery 1350 may include a device to supply power to at least one component of the electronic device 1300, for example, a non-rechargeable primary battery, or a rechargeable secondary battery, or a fuel cell. At least a portion of the battery 1350 may be, for example, substantially aligned in line with the printed circuit board 1340. The battery 1350 may be disposed inside the electronic device 1300 integrally with the electronic device 1300, and may be disposed detachably from the electronic device 1300.

The antenna 1370 may be interposed between the rear plate 1380 and the battery 1350. The antenna 1370 may include, for example, a near field communication (NFC) antenna, a wireless charging antenna, and/or a magnetic secure transmission (MST) antenna. The antenna 1370 may make local area network communication with an external device or may wirelessly transmit/receive power necessary for charging. In another embodiment, an antenna structure may be formed by a portion of the side bezel structure 1318 and/or the first support member 1311 or the combination of the side bezel structure 1318 and the first support member 1311.

Figure 16:
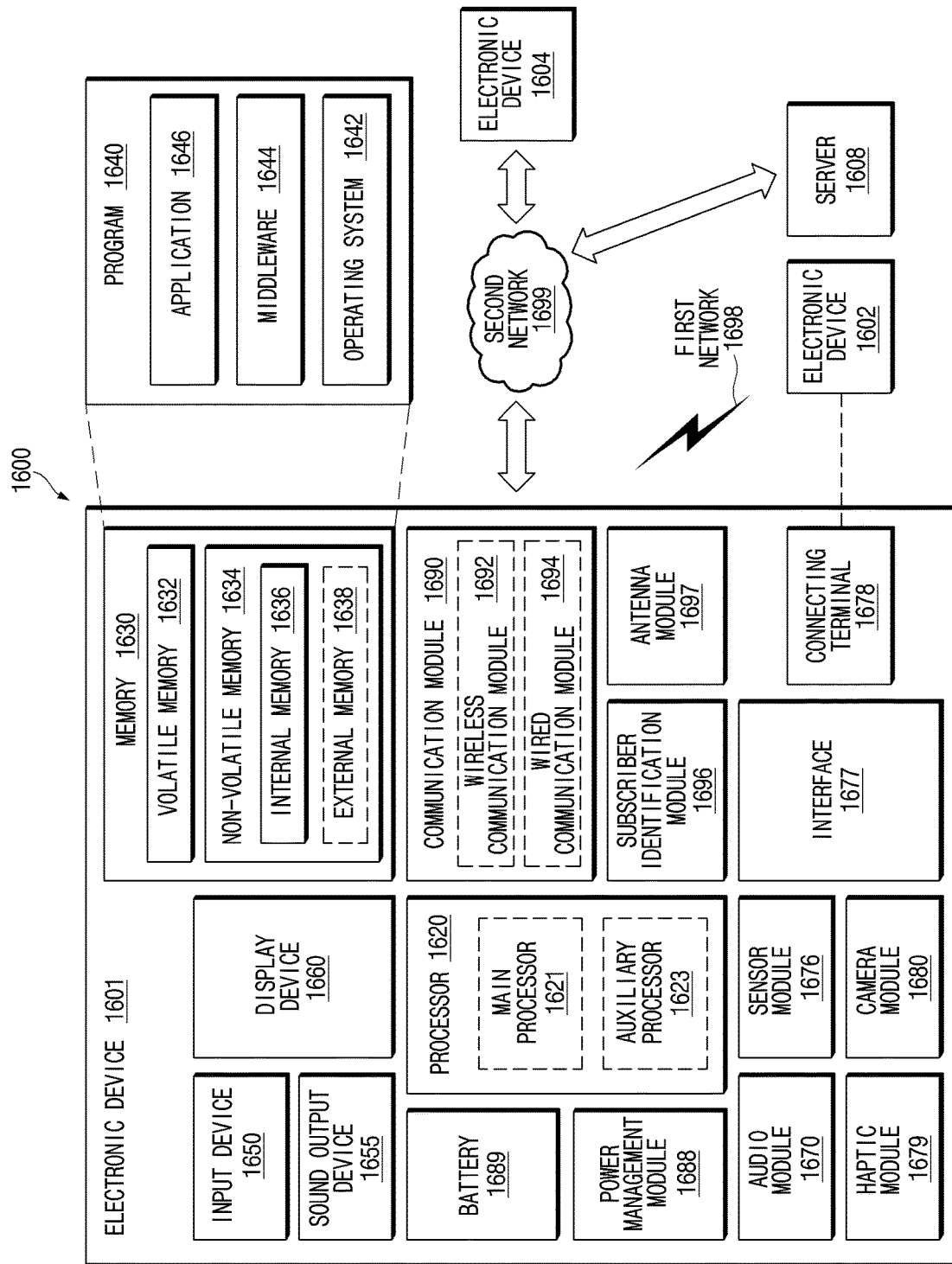
FIG. 16 is a block diagram illustrating an electronic device in a network environment, according to an embodiment.

FIG. 16 is a block diagram illustrating an electronic device 1601 in a network environment 1600 according to various embodiments. Referring to FIG. 16, the electronic device 1601 in the network environment 1600 may communicate with an electronic device 1602 via a first network 1698 (e.g., a short-range wireless communication network), or an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input device 1650, a sound output device 1655, a display device 1660, an audio module 1670, a sensor module 1676, an interface 1677, a haptic module 1679, a camera module 1680, a power management module 1688, a battery 1689, a communication module 1690, a subscriber identification module (SIM) 1696, or an antenna module 1697. In some embodiments, at least one (e.g., the display device 1660 or the camera module 1680) of the components may be omitted from the electronic device 1601, or one or more other components may be added in the electronic device 1601. In some embodiments, some of the components may be implemented as single integrated circuitry. For example, the sensor module 1676 (e.g., a fingerprint sensor, an iris sensor, or an illuminance sensor) may be implemented as embedded in the display device 1660 (e.g., a display).

The processor 1620 may execute, for example, software (e.g., a program 1640) to control at least one other component (e.g., a hardware or software component) of the electronic device 1601 coupled with the processor 1620, and may perform various data processing or computation.

According to one embodiment, as at least part of the data processing or computation, the processor 1620 may load a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), and an auxiliary processor 1623 (e.g., a graphics processing unit (GPU), an image signal processor (ISP), a sensor hub processor, or a communication processor (CP)) that is operable independently from, or in conjunction with, the main processor 1621. Additionally or alternatively, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display device 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input device 1650 may receive a command or data to be used by other component (e.g., the processor 1620) of the electronic device 1601, from the outside (e.g., a user) of the electronic device 1601. The input device 1650 may include, for example, a microphone, a mouse, a keyboard, or a digital pen (e.g., a stylus pen).

The sound output device 1655 may output sound signals to the outside of the electronic device 1601. The sound output device 1655 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1660 may visually provide information to the outside (e.g., a user) of the electronic device 1601. The display device 1660 may include, for example, a display, a hologram device, or a projector and control circuitry to control a corresponding one of the display, hologram device, and projector. According to an embodiment, the display device 1660 may include touch circuitry adapted to detect a touch, or sensor circuitry (e.g., a pressure sensor) adapted to measure the intensity of force incurred by the touch.

The audio module 1670 may convert a sound into an electrical signal and vice versa. According to an embodiment, the audio module 1670 may obtain the sound via the input device 1650, or output the sound via the sound output device 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692

(e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, wireless-fidelity (Wi-Fi) direct, or infrared data association (IrDA)) or the second network 1699 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The antenna module 1697 may transmit or receive a signal or power to or from the outside (e.g., the external electronic device) of the electronic device 1601. According to an embodiment, the antenna module 1697 may include an antenna including a radiating element composed of a conductive material or a conductive pattern formed in or on a substrate (e.g., PCB). According to an embodiment, the antenna module 1697 may include a plurality of antennas. In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. Each of the electronic devices 1602 and 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, or client-server computing technology may be used, for example.

Figure 17:
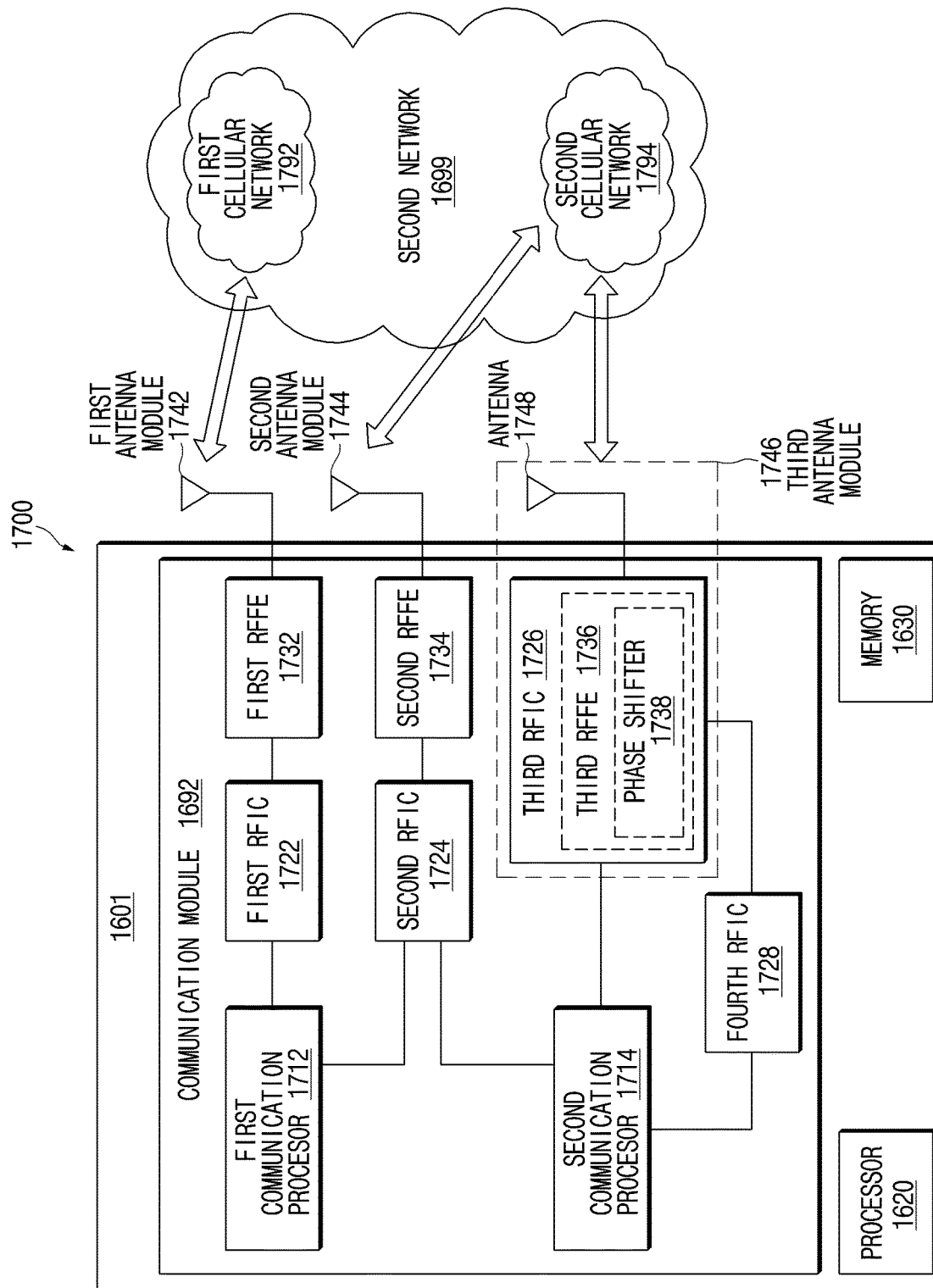
FIG. 17 is a block diagram of an electronic device to support legacy network communication and 5G network communication, according to an embodiment.

FIG. 17 is a block diagram 1700 of the electronic device 1601 to support legacy network communication and 5G network communication, according to an embodiment. Referring to FIG. 17, the electronic device 1601 may include a first communication processor 1712, a second communication processor 1714, a first radio frequency integrated circuit (RFIC) 1722, a second RFIC 1724, a third RFIC 1726, a fourth RFIC 1728, a first radio frequency front end (RFFE) 1732, a second RFFE 1734, a first antenna module 1742, a second antenna module 1744, and an antenna 1748. The electronic device 1601 may further include the processor 1620 and the memory 1630. The second network 1699 may include a first cellular network 1792 and a second cellular network 1794. According to another embodiment, the electronic device 1601 may further include at least one part of parts disclosed in FIG. 16, and the second network 1699 may further include at least one different network. According to an embodiment, the first communication processor 1712, the second communication processor 1714, the first RFIC 1722, the second RFIC 1724, the fourth RFIC 1728, the first RFFE 1732, and the second RFFE 1734 may form at least a portion of the wireless communication module 1692. According to another embodiment, the fourth RFIC 1728 may be omitted or included as a portion of the third RFIC 1726.

The first communication processor 1712 may establish a communication channel having a band to be used for wireless communication with the first cellular network 1792, and may support legacy network communication through the established communication channel. According to an embodiment, the first cellular network 1792 may be a legacy network including a second generation (2G) network, a third generation (3G) network, a fourth generation (4G) network, and/or a long term evolution (LTE) network. The second communication processor 1714 may establish a communication channel corresponding to a specific band (e.g., ranging from about 6 GHz to about 60 GHz) of bands to be used for wireless communication with the second cellular network 1794, and may support 5G network communication through the established communication channel. According to an embodiment, the second cellular network 1794 may be a 5G network defined in the 3GPP. Additionally, according to an embodiment, the first communication processor 1712 or the second communication processor 1714 may establish a communication channel corresponding to another different specific band (e.g., about 6 GHz or less) of bands to be used for wireless communication with the second cellular network 1794, and may support 5G network communication through the established communication channel. According to an embodiment, the first communication processor 1712 and the second communication processor 1714 may be implemented in a single chip or a single package. According to an embodiment, the first communication processor 1712 or the second communication processor 1714 may be formed in a single chip or a single package together with the processor 1620, the auxiliary processor 1623 of FIG. 16, or the communication module 1690.

The first RFIC 1722 may convert, in transmission, a baseband signal generated by the first communication processor 1712 into a radio frequency (RF) signal in the band of about 700 MHz to about 3 GHz used in the first cellular network 1792 (e.g., a legacy network). In reception, an RF signal is obtained from the first cellular network 1792 (e.g., a legacy network) through an antenna (e.g., the first antenna module 1742), and may be preprocessed through the RFFE (e.g., the first RFFE 1732). The first RFIC 1722 may convert the preprocessed RF signal into a baseband signal to be processed by the first communication processor 1712.

The second RFIC 1724 may convert, in transmission, a baseband signal generated by the first communication processor 1712 or the second communication processor 1714 into a radio frequency (RF) signal (hereinafter, referred to as a 5G Sub6 RF signal) in the Sub6 band used in the second cellular network 1794 (e.g., a 5G network). In reception, the 5G Sub6 RF signal is obtained from the second cellular network 1794 (e.g., a 5G network) through an antenna (e.g., the second antenna module 1744), and may preprocessed through the RFFE (e.g., the second RFFE 1734). The second RFIC 1724 may convert the preprocessed 5G Sub6 RF signal into a baseband signal such that the preprocessed 5G Sub6 RF signal may be processed by a communication processor corresponding to the first communication processor 1712 or the second communication processor 1714.

The third RFIC 1726 may convert, in transmission, a baseband signal generated by the second communication processor 1714 into a radio frequency (RF) signal (hereinafter, referred to as a 5G Above6 RF signal) in the 5G Above6 band (e.g., the band of about 6 GHz to about 60 GHz to be used in the second cellular network 1794 (e.g., a 5G network). In reception, the 5G Above6 RF signal is obtained from the second cellular network 1794 (e.g., a 5G network) through an antenna (e.g., the antenna 1748), and may preprocessed through a third RFFE 1736. For example, the third RFFE 1736 may perform signal preprocessing using a phase shifter 1738. The third RFIC 1726 may convert the preprocessed 5G Above6 RF signal into a baseband signal to be processed by the second communication processor 1714. According to an embodiment, the third RFFE 1736 may be formed as part of the third RFIC 1726.

According to an embodiment, the electronic device 1601 may include the fourth RFIC 1728 separately from or at least as a portion of the third RFIC 1726. In this case, for transmission of data, the fourth RFIC 1728 may convert a baseband signal generated by the second communication processor 1714 to an RF signal (hereinafter, referred to as an "intermediate frequency (IF) signal") having an intermediate frequency band (e.g., the band of about 9 GHZ to about 11 GHz) and may transmit the IF signal to the third RFIC 1726. The third RFIC 1726 may convert the IF signal to the 5G Above6 RF signal. In reception, the 5G Above6 RF signal may be obtained from the second cellular network 1794 (e.g., a 5G network) through an antenna (e.g., the antenna 1748), and may be converted into the IF signal by the third RFIC 1726. The fourth RFIC 1728 may convert the IF signal into a baseband signal to be processed by the second communication processor 1714.

According to an embodiment, the first RFIC 1722 and the second RFIC 1724 may be realized as at least a portion of a single chip or a single package. According to an embodiment, the first RFFE 1732 and the second RFFE 1734 may be realized as at least a portion of a single chip or a single package. According to an embodiment, at least one antenna module of the first antenna module 1742 or the second antenna module 1744 may be omitted or combined with another antenna module to process RF signals of a corresponding of bands.

According to an embodiment, the third RFIC 1726 and the antenna 1748 may be disposed on the same substrate to form a third antenna module 1746. For example, the wireless communication module 1692 or the processor 1620 may be disposed on the first substrate (e.g., main PCB). In this case, to form the third antenna module 1746, the third RFIC 1726 may be disposed at a portion (e.g., a bottom surface) of the second substrate (e.g., the sub PCB) separate from the first substrate and the antenna 1748 may be disposed at another portion of the second substrate, thereby forming the third antenna module 1746. According to an embodiment, the antenna 1748 may include an antenna array that may be used for beam foaming. The third RFIC 1726 and the antenna 1748 are disposed on the same substrate, thereby reducing the length of the transmission line between the third RFIC 1726 and the antenna 1748. Accordingly, the loss (e.g., attenuation) of a signal, which has a high frequency band (e.g., the band of about 6 GHz to about 60 GHz) used for the 5G network communication, on a transmission line may be reduced. Accordingly, the electronic device 1601 may improve the quality or the data rate of the communication with the second cellular network 1794 (e.g., a 5G network).

The second cellular network 1794 (e.g., 5G network) may be operated independently from the first cellular network 1792 (e.g., a legacy network) (e.g., Stand-Alone (SA)), or may be operated in connection with the first cellular network 1792 (e.g., Non-Stand Alone (NSA)). For example, the 5G network may have only an access network (e.g., a 5G radio access network (RAN) or a next generation RAN (NG RAN)), and may not include a core network (e.g., a next generation core (NGC)). In this case, the electronic device 1601 may access the access network in the 5G network and then access the external network (e.g., Internet) under the core network (e.g., evolved packed core (EPC)) of the legacy network. Protocol information (e.g., LTE protocol information) for communication with the legacy network or protocol information (e.g., new radio (NR) protocol information) for communication with 5G network communication may be stored in the memory 1630 and may accessed by another part (e.g., the processor 1620, the first communication processor 1712, or the second communication processor 1714).

Figure 18:
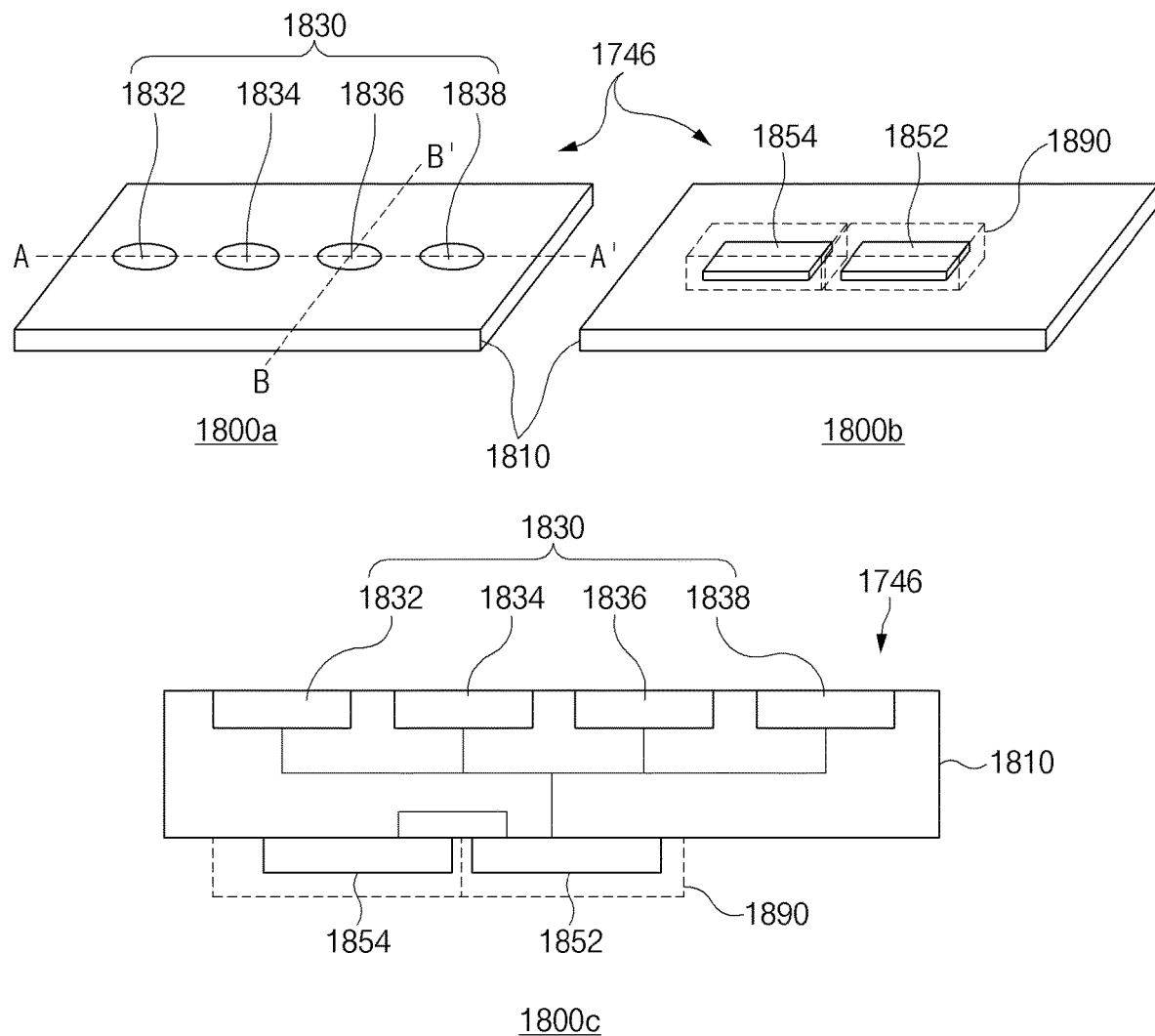
FIG. 18 is a view illustrating the structure of a third antenna module described with reference to FIG. 17, according to an embodiment.

FIG. 18 is a view illustrating the structure of the third antenna module 1746 described with reference to FIG. 17 according to an embodiment. Reference numeral 1800a of FIG. 18 illustrates a perspective view when the third antenna module 1746 is viewed from one side, and reference numeral 1800b of FIG. 18 illustrates a perspective view when the third antenna module 1746 is viewed from another side. Reference numeral 1800c of FIG. 18 is a sectional view of the third antenna module 1746 taken along line A-A'.

Referring to FIG. 18, in an embodiment, the third antenna module 1746 may include a printed circuit board 1810, an antenna array 1830, a radio frequency integrate circuit (RFIC) 1852, and a power manage integrate circuit (PMIC) 1854, and a module interface (not illustrated). Alternatively, the third antenna module 1746 may further include a shielding member 1890. According to another embodiment, at least one of the above-described parts may be omitted or at least two of the parts may be formed integrally with each other.

The printed circuit board 1810 may include a plurality of conductive layers and a plurality of non-conductive layers stacked alternately with the conductive layers. The printed circuit board 1810 may provide electrical connections between various parts of the printed circuit board 1810 and/or various electronic parts disposed outside through wires and conductive vias formed in the conductive layers.

The antenna array 1830 (e.g., reference numeral 1748 in FIG. 17) may include a plurality of antenna elements 1832, 1834, 1836, or 1838 disposed to form a directional beam. The antenna elements may be formed on the first surface of the printed circuit board 1810 as illustrated in FIG. 18. According to another embodiment, the antenna array 1830 may be formed inside the printed circuit board 1810. According to embodiments, the antenna array 1830 may include a plurality of antenna arrays (e.g., a dipole antenna array, and/or a patch antenna array) having the same or different shape or type.

The RFIC 1852 (for example, the third RFIC 1726 of FIG. 17) may be disposed in another area (e.g., the second surface opposite to the first surface) of the printed circuit board 1810 separated from the antenna array 1830. The RFIC 1852 may be configured to process a signal of a selected frequency band transmitted/received through the antenna array 1830. According to an embodiment, the RFIC 1852 may convert a baseband signal obtained from a communication processor (not shown) into an RF signal having a specific band in transmission. The RFIC 1852 may convert an RF signal received through the antenna array 1830 into a baseband signal and transmit the converted baseband signal to the communication processor.

According to another embodiment, the RFIC 1852 may up-convert, in transmission, the IF signal (e.g., having the band of about 9 GHz to about 11 GHz)) obtained from an intermediate frequency integrate circuit (IFIC) (the fourth RFIC 1728 of FIG. 17) to the RF signal having the selected band. The RFIC 1852 may down-convert, in reception, the RF signal obtained through the antenna array 1830 into the IF signal to be transmitted to the IFIC.

The PMIC 1854 may be disposed in another partial area (e.g., the second surface), which is separated from the antenna array, of the printed circuit board 1810. The PMIC 1854 may receive a voltage from the main PCB (not illustrated) and may provide power necessary for various components (e.g., RFIC 1852) on the antenna module.

The shielding member 1890 may be disposed on a portion (e.g., the second surface) of the printed circuit board 1810 to electromagnetically shield at least one of the RFIC 1852 or the PMIC 1854. According to one embodiment, the shielding member 1890 may include a shield can.

Although not illustrated, in an embodiment, the third antenna module 1746 may be electrically connected with another printed circuit board (e.g., a main circuit board) through a module interface. The module interface may include a connecting member, for example, a coaxial cable connector, a board to board connector, an interposer, or a flexible printed circuit board (FPCB). The RFIC 1852 and/or the PMIC 1854 of the third antenna module 1746 may be electrically connected with the printed circuit board through the connecting member.

Figure 19:
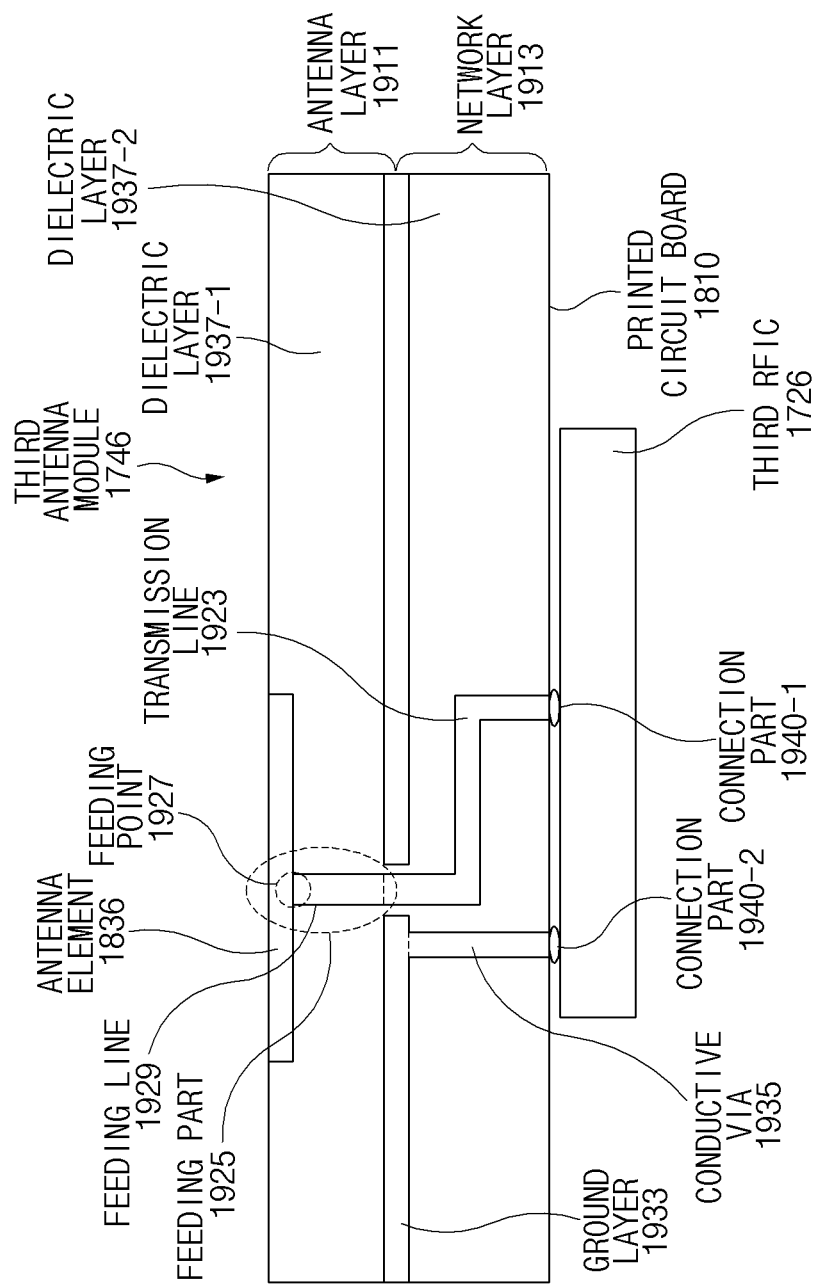
FIG. 19 is a sectional view of the third antenna module taken along line B-B' of FIG. 18.

FIG. 19 is a sectional view of the third antenna module 1746 taken along line B-B' in illustrated in reference numeral 1800a of FIG. 18. According to the illustrated embodiment, the printed circuit board 1810 may include an antenna layer 1911 and a network layer 1913.

The antenna layer 1911 may include at least one dielectric layer 1937-1 and the antenna element 1836 and/or a feeding unit 1925 formed on the external surface of the dielectric layer or in the inner part of the dielectric layer. The feeding unit 1925 may include a feeding point 1927 and/or a feeding line 1929.

The network layer 1913 may include at least one dielectric layer 1937-2, and at least one ground layer 1933, at least one conductive via 1935, a transmission line 1923, and/or a signal line 1929 formed on an external surface of the dielectric layer or in the inner part of the dielectric layer.

In addition, in the illustrated embodiment, the third RFIC 1726 may be electrically connected with the network layer 1913, for example, through first and second solder bumps (first and second connectors) 1940-1 and 1940-2. According to other embodiments, various connection structures (for example, a solder or a ball grid array (BGA)) may be used instead of the solder bumps. The third RFIC 1726 may be electrically connected with the antenna element 1836 through a first connector 1940-1, the transmission line 1923, and the feeding unit 1925. The third RFIC 1726 may also be electrically connected with the ground layer 1933 through the second connector 1940-2 and the conductive via 1935. Although not shown, the third RFIC 1726 may also be electrically connected with the above-described module interface through the signal line 1929.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor(e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments, the performance of the signal radiated from the antenna structure may be prevented from being degraded based on the modification in the structure of the electronic device, thereby supporting improved operation of 5G mobile communication by the electronic device including the antenna structure.

In addition, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
   a housing including a first plate having an external surface facing in a first direction, a second plate having an external surface facing in a second direction opposite to the first direction, and a side member surrounding a first space between the first plate and the second plate and coupled to the second plate or integrated with the second plate;
   a support member coupled to the side member or integrated with the side member, interposed between the first plate and the second plate, and including a metallic structure;
   an antenna structure interposed between the first plate and the support member, mounted on the support member, including a first surface facing in a third direction toward the side member, and including at least one antenna pattern configured to output a directional beam facing in the third direction;
   a polymer structure disposed in a second space surrounded by the first plate, the support member, the side member, and the first surface of the antenna structure, and coupled to the metallic structure; and
   a wireless communication circuitry electrically connected with the antenna pattern and configured to transmit and/or receive a signal having a frequency between 3 GHz and 100 GHz,
   wherein the coupled metallic structure and polymer structure includes at least one groove bounded by the first surface, a second surface on the polymer structure forming an acute angle with the first surface, and a third surface substantially perpendicular to the second surface.

2. The electronic device of claim 1, wherein the antenna structure is disposed at a lower area of a right edge of the electronic device when the electronic device is viewed in the second direction.

3. The electronic device of claim 2, wherein the support member and the polymer structure are disposed at the lower area of the right edge of the electronic device.

4. The electronic device of claim 1, wherein the support member further comprises a step formed at one area extending away from the side member.

5. The electronic device of claim 4, wherein the support member further comprises a rib formed at an end of the support member further away from the side member than the step, the rib extending from the end in the first direction.

6. The electronic device of claim 5, further comprising:
   a battery disposed in a third space surrounded by the first plate, the second plate, and the support member, wherein the battery and the antenna structure are disposed on opposite sides of the rib.

7. The electronic device of claim 5, wherein the antenna structure is mounted on the support member such that at least a portion of the first surface makes contact with the step of the support member, and at least a portion of a fourth surface, which is an opposite surface to the first surface, makes contact with the rib of the support member.

8. The electronic device of claim 1, wherein the polymer structure further comprises:
one area coupled to the metallic structure; and
another area coupled to the side member.

9. The electronic device of claim 1, wherein the first plate includes an edge area curved with a specific curvature and extending in the second direction.

10. The electronic device of claim 9, wherein the polymer structure further comprises:
an area having a shape corresponding to a shape of the edge area of the first plate and making contact with the edge area of the first plate; and
another area making contact with the first surface of the antenna structure.

11. The electronic device of claim 1, wherein the third surface is disposed on at least a portion of the metallic structure and at least a portion of the polymer structure.

12. The electronic device of claim 1, wherein the at least one groove is an air gap.

13. The electronic device of claim 1, wherein the antenna structure further comprises:
a patch antenna;
a printed circuit board coupled to the at least one antenna pattern;
a heat radiation member surrounding at least a portion of the printed circuit board and the patch antenna; and
a flexible printed circuit board electrically connecting the patch antenna with the wireless communication circuitry.

14. An electronic device comprising:
a housing including a first plate having an external surface facing in a first direction, a second plate having an external surface facing in a second direction opposite to the first direction, and a side member surrounding a first space between the first plate and the second plate;
a support member coupled to the side member or integrated with the side member, interposed between the first plate and the second plate, and including a metallic structure;
an antenna structure interposed between the first plate and the support member, mounted on the support member, including a first surface facing in a third direction toward the side member, and including at least one antenna pattern configured to output a directional beam facing in the third direction;
a polymer structure coupled to the first plate or integrated with the first plate to be disposed in a second space surrounded by the first plate, the support member, the side member, and the first surface of the antenna structure, and coupled to the metallic structure, when the first plate and the side member are coupled to each other; and
a wireless communication circuitry electrically connected with the antenna pattern and configured to transmit and/or receive a signal having a frequency between 3 GHz and 100 GHz.

15. The electronic device of claim 14, wherein the polymer structure further comprises at least one groove having a surface at an inclination with the first surface of the antenna structure, when the first plate and the side member are coupled to each other.

16. The electronic device of claim 14, wherein the polymer structure further comprises at least one groove having a surface parallel to the first surface of the antenna structure, when the first plate and the side member are coupled to each other.

17. An electronic device comprising:
a housing including a first plate having an external surface facing in a first direction, a second plate having an external surface facing in a second direction opposite to the first direction, and a side member surrounding a first space between the first plate and the second plate and coupled to the second plate or integrated with the second plate;
a support member coupled to the side member or integrated with the side member, interposed between the first plate and the second plate, and including a metallic structure;
an antenna structure interposed between the first plate and the support member, mounted on the support member, including a first surface facing in a third direction toward the side member, and including at least one antenna pattern configured to output a directional beam facing in the third direction;
a polymer structure disposed in a second space surrounded by the first plate, the support member, the side member, and the first surface of the antenna structure, and coupled to the metallic structure; and
a wireless communication circuitry electrically connected with the antenna pattern and configured to transmit and/or receive a signal having a frequency between 3 GHz and 100 GHz,
wherein the coupled metallic structure and polymer structure includes at least one groove bounded by the first surface, a second surface on the polymer structure forming an acute angle with the first surface, a third surface forming an obtuse angle with the second surface; and a fourth surface forming an acute angle with the second surface.

18. The electronic device of claim 17, wherein the support member further comprises:
a step formed at one area extending away from the side member; and
a rib formed at an end of the support member further away from the side member than the step, the rib extending from the end in the first direction.

19. The electronic device of claim 18, further comprising a battery disposed in a third space surrounded by the first plate, the second plate, and the support member, wherein the battery and the antenna structure are disposed on opposite sides of the rib.

20. The electronic device of claim 18, wherein the antenna structure is mounted on the support member such that at least a portion of the first surface makes contact with the step of the support member, and at least a portion of a fifth surface, which is an opposite surface to the first surface, makes contact with the rib of the support member.

* * * * *